US012446863B2

(12) United States Patent
Da et al.

(10) Patent No.: US 12,446,863 B2
(45) Date of Patent: Oct. 21, 2025

(54) METHODS AND DEVICES FOR SPLICING ULTRASOUND SIGNAL

(71) Applicant: WUHAN UNITED IMAGING HEALTHCARE CO., LTD., Hubei (CN)

(72) Inventors: Yihui Da, Wuhan (CN); Yaowen Zhang, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 222 days.

(21) Appl. No.: 18/155,134

(22) Filed: Jan. 17, 2023

(65) Prior Publication Data
US 2023/0338009 A1   Oct. 26, 2023

Related U.S. Application Data

(63) Continuation of application No. PCT/CN2022/132264, filed on Nov. 16, 2022.

(30) Foreign Application Priority Data

Apr. 24, 2022   (CN) .......................... 202210455204.9

(51) Int. Cl.
*A61B 8/00*   (2006.01)
*A61B 8/06*   (2006.01)
*G01S 15/89*   (2006.01)

(52) U.S. Cl.
CPC .............. *A61B 8/5269* (2013.01); *A61B 8/06* (2013.01); *A61B 8/488* (2013.01); *A61B 8/5207* (2013.01); *G01S 15/8979* (2013.01)

(58) Field of Classification Search
CPC ......... A61B 8/06; A61B 8/488; A61B 8/5246; A61B 8/5269; G01S 15/8979;
(Continued)

(56) References Cited

U.S. PATENT DOCUMENTS 4,930,513 A *   6/1990   Mayo ...................... G01P 5/244
                                                  600/455
4,991,589 A     2/1991   Hongo et al.
(Continued)

FOREIGN PATENT DOCUMENTS

CN         101336830           1/2009
CN         101460094 A          6/2009
(Continued)

OTHER PUBLICATIONS

T. Baba, "Time-Frequency Analysis Using Short Time Fourier Transform", The Open Acoustics Journal, vol. 5, pp. 32-38, 2012 (Year: 2012).*

(Continued)

*Primary Examiner* — Pascal M Bui Pho
*Assistant Examiner* — Nyrobi Celestine
(74) *Attorney, Agent, or Firm* — METIS IP LLC

(57) ABSTRACT

The embodiments of the present disclosure provide a method and a device for signal processing. The method includes: obtaining multiple sets of initial Doppler blood flow signals, sampling times of the multiple sets of initial Doppler blood flow signals being discontinuous; and performing a splicing processing on the multiple sets of initial Doppler blood flow signals, to obtain a target Doppler blood flow signal.

19 Claims, 17 Drawing Sheets

(58) Field of Classification Search
CPC ............ G01S 15/8988; G01S 7/52026; G01S 7/52077; G01S 15/52; G01S 15/8981
See application file for complete search history.

(56) References Cited

U.S. PATENT DOCUMENTS

| | | | |
|---|---|---|---|
| 5,016,641 | A | 5/1991 | Schwartz |
| 5,642,732 | A | 7/1997 | Wang |
| 5,891,036 | A | 4/1999 | Izumi |
| 6,048,312 | A * | 4/2000 | Ishrak .................. A61B 8/0833 600/443 |
| 6,309,357 | B1 * | 10/2001 | Guracar ............. G01S 7/52025 600/454 |
| 6,450,959 | B1 * | 9/2002 | Mo ..................... G01S 15/8979 600/455 |
| 6,511,426 | B1 | 1/2003 | Hossack et al. |
| 2002/0169378 | A1 * | 11/2002 | Mo ..................... G01S 7/52084 600/437 |
| 2005/0033174 | A1 | 2/2005 | Moehring et al. |
| 2005/0177044 | A1 * | 8/2005 | Rubin .................... A61B 6/488 600/437 |
| 2006/0052699 | A1 * | 3/2006 | Angelsen ............ G01S 7/52042 600/437 |
| 2008/0188751 | A1 * | 8/2008 | Sato .................... G01S 15/8981 600/454 |
| 2009/0093718 | A1 | 4/2009 | Jibiki et al. |
| 2010/0099990 | A1 * | 4/2010 | Lee .......................... A61B 8/06 600/453 |
| 2010/0113926 | A1 * | 5/2010 | Rigby .................... A61B 8/488 600/437 |
| 2017/0027546 | A1 * | 2/2017 | Freiburger ........... A61B 8/5207 |
| 2017/0086793 | A1 * | 3/2017 | Sato ..................... A61B 8/5207 |
| 2017/0202541 | A1 * | 7/2017 | Ralston .............. G01S 15/8977 |
| 2017/0296150 | A1 * | 10/2017 | Rosenzweig ....... G01S 7/52077 |
| 2017/0307742 | A1 * | 10/2017 | Hope Simpson ........ A61B 8/06 |
| 2019/0083066 | A1 * | 3/2019 | Guo ..................... A61B 8/5207 |
| 2020/0229787 | A1 * | 7/2020 | Asami .................. A61B 8/5223 |

FOREIGN PATENT DOCUMENTS

| | | |
|---|---|---|
| CN | 104622505 A | 5/2015 |
| CN | 102871689 B | 7/2015 |
| CN | 105407808 A | 3/2016 |
| CN | 104783836 B | 6/2017 |
| CN | 111050657 A | 4/2020 |
| JP | H1014919 A | 1/1998 |

OTHER PUBLICATIONS

D. Posada et al, "Staggered Multiple-PRF Ultrafast Color Doppler", IEEE Transactions on Medical Imaging, vol. 35, No. 6, pp. 1510-1521, Jun. 2016 (Year: 2016).*

Z. Guo et al, "Comparison of Time-Frequency Distribution Techniques for Analysis of Simulated Doppler Ultrasound Signals of the Femoral Artery", IEEE Transactions on Biomedical Engineering, vol. 41, No. 4, pp. 332-342, Apr. 1994 (Year: 1994).*

C. Kargel et al, "Doppler Ultrasound Systems Designed for Tumor Blood Flow Imaging", IEEE Transactions on Instrumentation and Measurement, vol. 43, No. 2, pp. 524-536, Apr. 2004 (Year: 2004).*

B. Yiu et al, "High-Frame-Rate Ultrasound Color-Encoded Speckle Imaging of Complex Flow Dynamics", Ultrasound in Medicine and Biology, vol. 39, No. 6, pp. 1015-1025, Dec. 2012 (Year: 2012).*

T. Fredriksen et al, "2-D Tracking Doppler: A New Method to Limit Spectral Broadening in Pulsed Wave Doppler", IEEE Transactions on Ultrasonics, Ferroelectrics, and Frequency Control, vol. 60, No. 9, pp. 1896-1905, Sep. 2013 (Year: 2013).*

R. Matera et al, "Novel Ultrasound Doppler Methods for Blood Flow Characterization", Universita Degli Studi Firenze, pp. 1-138, 2015 (Year: 2015).*

J. Ketterling et al, "High-speed, high-frequency ultrasound, in utero vector-flow imaging of mouse embryos", Scientific Reports, vol. 7, No. 16658, pp. 1-9, Nov. 2017 (Year: 2017).*

S. Ricci et al, "Real-Time Blood Velocity Vector Measurement Over a 2-D Region", IEEE Transactions on Ultrasonics, Ferroelectrics, and Frequency Control, vol. 65, No. 2, pp. 201-209, Feb. 2018 (Year: 2018).*

V. Milovanovic, "On Fundamental Operating Principles and Range-Doppler Estimation in Monolithic Frequency-Modulated Continuous-Wave Radar Sensors", Electronics and Energetics, vol. 31, No. 4, pp. 547-570, Dec. 2018 (Year: 2018).*

T. Lauteslager et al, "Coherent UWB Radar-on-Chip for In-Body Measurement of Cardiovascular Dynamics", IEEE Transactions on Biomedical Circuits and Systems, vol. XX, No. YY, pp. 1-11, 2019 (Year: 2019).*

M. Ojaroudi et al, Multiple Time-Variant Targets Detection using MIMO Radar Framework for Cerebrovascular Monitoring, 2021 15th European Conference on Antennas and Propagation (EuCAP), pp. 1-5, Mar. 2021 (Year: 2021).*

Y. Rong et al, "Radar-Based Radial Arterial Pulse Rate and Pulse Pressure Analysis", 2021 29th European Signal Processing Conference (EUSIPCO), pp. 1870-1974, 2021 (Year: 2021).*

M. Abdul-Atty et al, "C-Band FMCW Radar Design and Implementation for Breathing Rate Estimation", Advances in Science, Technology and Engineering Systems Journal, vol. 5, No. 5, pp. 1299-1307, Oct. 2020 (Year: 2020).*

* cited by examiner

500

501

Obtaining multiple sets of sampling data in a slow time direction, wherein each set of sampling data includes first sampling sub-data of multiple sampling points in a fast time direction

502

For each set of the multiple sets of sampling data, performing a second signal processing on the first sampling sub-data of the multiple sampling points according to the fast time direction, to obtain second sampling sub-data corresponding to the first sampling sub-data

503

Performing a third processing on the second sampling sub-data according to the fast time direction, to obtain a set of initial Doppler blood flow signals

Obtaining multiple sets of initial Doppler blood flow signals, and ranking the multiple sets of initial Doppler blood flow signals according to generation times of the multiple sets of initial Doppler blood flow signals, to generate a first Doppler blood flow signal, such that a time of the first Doppler blood flow signal is continuous

702

Determining a preset screening frequency set according to pulse repetition frequencies of the initial Doppler blood flow signals, wherein the preset screening frequency set includes at least two preset screening frequencies

703

Screening a target Doppler blood flow signal from the first Doppler blood flow signal based on preset screening frequencies in the preset screening frequency set, and generating a Doppler blood flow image based on the target Doppler blood flow signal

```
┌─────────────────────────────────────────────────────┐
│ Determining multiple high-pass filters corresponding to │  1301
│ preset screening frequencies based on preset screening │
│ frequencies, cut-off frequencies of the high-pass filters │
│        being the preset screening frequencies          │
└─────────────────────────────────────────────────────┘
                            │
                            ▼
┌─────────────────────────────────────────────────────┐
│ Performing, by the multiple high-pass filters, a filtering │  1302
│     processing on a first Doppler blood flow signal,    │
│ respectively, to generate multiple sets of second Doppler │
│  blood flow signals corresponding to the preset screening │
│                      frequencies                      │
└─────────────────────────────────────────────────────┘
```

```
┌──────────────────────────────────────────────────┐
│ For each set of third Doppler blood flow signals,│ ─ 1401
│ determining a preset screening frequency range   │
│ corresponding to the each set of third Doppler   │
│ blood flow signals according to a target         │
│ screening frequency of the each set of third     │
│ Doppler blood flow signals and pulse repetition  │
│ frequencies of multiple sets of initial Doppler  │
│ blood flow signals                               │
└──────────────────────────────────────────────────┘
                        │
                        ▼
┌──────────────────────────────────────────────────┐
│ For each set of third Doppler blood flow signals,│ ─ 1402
│ screening a target Doppler blood flow signal from│
│ the each set of third Doppler blood flow signals │
│ according to the preset screening frequency range│
│ corresponding to the each set of third Doppler   │
│ blood flow signals                               │
└──────────────────────────────────────────────────┘
```

```
┌──────────────────────────────────────────────────┐
│ For each set of third Doppler blood flow signals,│ ─ 1501
│ screening multiple set of fourth Doppler blood   │
│ flow signals within a preset screening frequency │
│ range from the each set of third Doppler blood   │
│ flow signals                                     │
└──────────────────────────────────────────────────┘
                        │
                        ▼
┌──────────────────────────────────────────────────┐
│ Combining the multiple sets of fourth Doppler    │ ─ 1502
│ blood flow signals according to frequency sizes  │
│ of the multiple sets of fourth Doppler blood flow│
│ signals, to obtain a target Doppler blood flow   │
│ signal                                           │
└──────────────────────────────────────────────────┘
```

FIG. 15

METHODS AND DEVICES FOR SPLICING ULTRASOUND SIGNAL

CROSS-REFERENCE TO RELATED APPLICATIONS

This application is a Continuation of International Application No. PCT/CN2022/132264, filed on Nov. 16, 2022, which claims priority to Chinese Patent Application No. 202210455204.9, filed on Apr. 24, 2022, the entire contents of each of which are hereby incorporated by reference.

TECHNICAL FIELD

The present disclosure relates to the technical field of ultrasonic imaging, and in particular, relates to methods and devices for signal processing.

BACKGROUND

With the development of ultrasonic imaging technology, an ultrasonic imaging system can display an anatomical structure and a blood flow condition of human tissues in real time using different imaging modes, which can bring convenience to clinicians. Generally, the anatomical structure of human tissue may be obtained by an imaging mode B, and the blood flow condition may be characterized by Doppler blood flow signals obtained by a pulsed-wave Doppler imaging (PW) mode.

At present, in the application of Doppler ultrasonic detection, Doppler blood flow signals may be obtained using an ultrasonic multi-synchronous mode. The ultrasonic multi-synchronous mode including PW may refer that B mode pulses (or C mode pulses) are transmitted within a transmission interval of PW mode pulses, so as to perform a synchronous display of the PW mode and the B mode (or the C mode). In order to realize the ultrasonic multi-synchronous mode, the ultrasonic imaging system may generally perform periodic scans in the B, C, and PW modes by switching a voltage and changing a transmission sequence, to obtain periodic echo signals in different modes. After the echo signals in different modes are obtained, the echo signals after beamforming may be sent to imaging units of different modes, displayed on a screen, and a sound in the PW mode may be played. There are two main ways to implement the multi-synchronous mode. One way is to insert only a small number of B or C mode transmission sequences in a PW transmission sequence. In this way, the PW transmission sequence may have no defects and the quality of a Doppler spectrum image may be relatively good. However, the number of display frames in B or C modes may limit the maximum pulse repetition frequency (PRF) of the PW mode, and a blood flow velocity that can be detected may be greatly reduced. The other way is to insert enough B or C sequences in the PW transmission sequence, and accordingly, the quality of the image obtained by the B or C modes is relatively good, and the maximum pulse repetition frequency (PRF) is not limited. However, during an imaging process, time periods occupied by the PW mode and the B imaging mode may be different. Doppler blood flow signals cannot be collected during the time period of the B imaging mode, which may cause too many interrupts and discontinuous in the PW transmission sequence, and may lead to the loss of Doppler blood flow signals. This may not be conducive to a subsequent analysis of blood flow conditions.

In order to solve the problem of discontinuous signal transmission and reception (loss of signal) in the PW mode, in prior arts, lost Doppler blood flow signals may be filled in a time domain or a frequency domain using an interpolation algorithm, to obtain continuous Doppler flow signals for the subsequent analysis of the blood flow conditions. However, in the case of massive data loss, the accuracy of the filled Doppler flow signals may be relatively low, thereby reducing the quality of a blood flow image.

Therefore, it is desirable to provide methods and devices for signal processing that can effectively resolve the impact of the loss of signal on imaging quality and improve the imaging quality of the blood flow image.

SUMMARY

One aspect of the embodiments of the present disclosure may provide a method for signal processing. The method may include: obtaining multiple sets of initial Doppler blood flow signals, sampling times of the multiple sets of initial Doppler blood flow signals being discontinuous; and performing a splicing processing on the multiple sets of initial Doppler blood flow signals, to obtain a target Doppler blood flow signal.

One of the embodiments of the present disclosure may provide a method for signal processing. The method may include: obtaining multiple sets of initial Doppler blood flow signals; ranking the multiple sets of initial Doppler blood flow signals according to generation times of the multiple sets of initial Doppler blood flow signals, to generate a first Doppler blood flow signal such that a time of the first Doppler blood flow signal is continuous; determining a preset screening frequency set according to pulse repetition frequencies of the multiple sets of initial Doppler blood flow signals, the preset screening frequency set including at least two preset screening frequencies; screening a target Doppler blood flow signal from the first Doppler blood flow signal based on the preset screening frequencies in the preset screening frequency set; and generating a Doppler blood flow image based on the target Doppler blood flow signal.

One aspect of the embodiments of the present disclosure may provide a device for signal processing. The device may include: an obtaining module configured to obtain multiple sets of initial Doppler blood flow signals, sampling times of the multiple sets of initial Doppler blood flow signals being discontinuous; and a determination module configured to perform a splicing processing on the multiple sets of initial Doppler blood flow signals, to obtain a target Doppler blood flow signal.

The embodiments of the present disclosure may at least include the following beneficial effects. (1) Compared with prior arts, in the case of massive data loss, the accuracy of the Doppler blood flow signal obtained by data filling may be relatively low, and the quality of the blood flow image may be relatively low. However, the obtained multiple sets of Doppler blood flow signals may be directly processed to generate the final Doppler blood flow image. Firstly, although the data volume of the first Doppler blood flow signal without filling is reduced, the signal can be used to characterize main features in the Doppler blood flow image. Secondly, since there are interferences in amplitudes corresponding to multiple frequency points in a spectrogram corresponding to the first Doppler blood flow signal, by dividing the third Doppler blood flow signal into multiple frequency ranges according to a preset screening frequency range, and screening a part of signal from each frequency range as the target Doppler blood flow signal, the frequency points with interference may be greatly reduced. The Doppler blood flow image may be obtained by sub-frequency range imaging, which may improve the quality of the Doppler blood flow image. (2) The multiple sets of initial Doppler blood flow signals with discontinuous sampling times may be spliced on a time axis to obtain a time-continuous first Doppler blood flow signal. Steps may appear in the first Doppler blood flow signal to cause a full-band interference. Before the time-frequency signal conversion is performed, the interference signals may be filtered out using a filter, to achieve the effect of removing the interference of most frequencies, and a total interference of a subsequent combination of the multiple sets of signals may be effectively reduced. (3) By performing a short-time Fourier transform on the signal, the signal may be analyzed segment by segment to obtain a set of local "spectrums" of the signal. A time-frequency signal conversion may be performed on the signal by setting a certain window length and a step size, which may facilitate a short-term time stationary signal analysis.

BRIEF DESCRIPTION OF THE DRAWINGS

The present disclosure is further described in terms of exemplary embodiments. These exemplary embodiments are described in detail with reference to the drawings. These embodiments are not limiting exemplary embodiments, in which like reference numerals represent similar structures throughout the several views of the drawings, and wherein:

FIG. 5 is a flowchart illustrating an exemplary process for obtaining an initial Doppler blood flow signal according to some embodiments of the present disclosure;

FIG. 7 is a flowchart illustrating an exemplary process for signal processing according to some embodiments of the present disclosure;

FIG. 13 is a flowchart illustrating an exemplary process for determining a second Doppler blood flow signal according to some embodiments of the present disclosure;

FIG. 14 is a flowchart illustrating an exemplary process for determining a preset screening frequency range according to some embodiments of the present disclosure;

FIG. 15 is a flowchart illustrating another exemplary process for determining a target Doppler blood flow signal according to some embodiments of the present disclosure;

DETAILED DESCRIPTION

Figure 1:
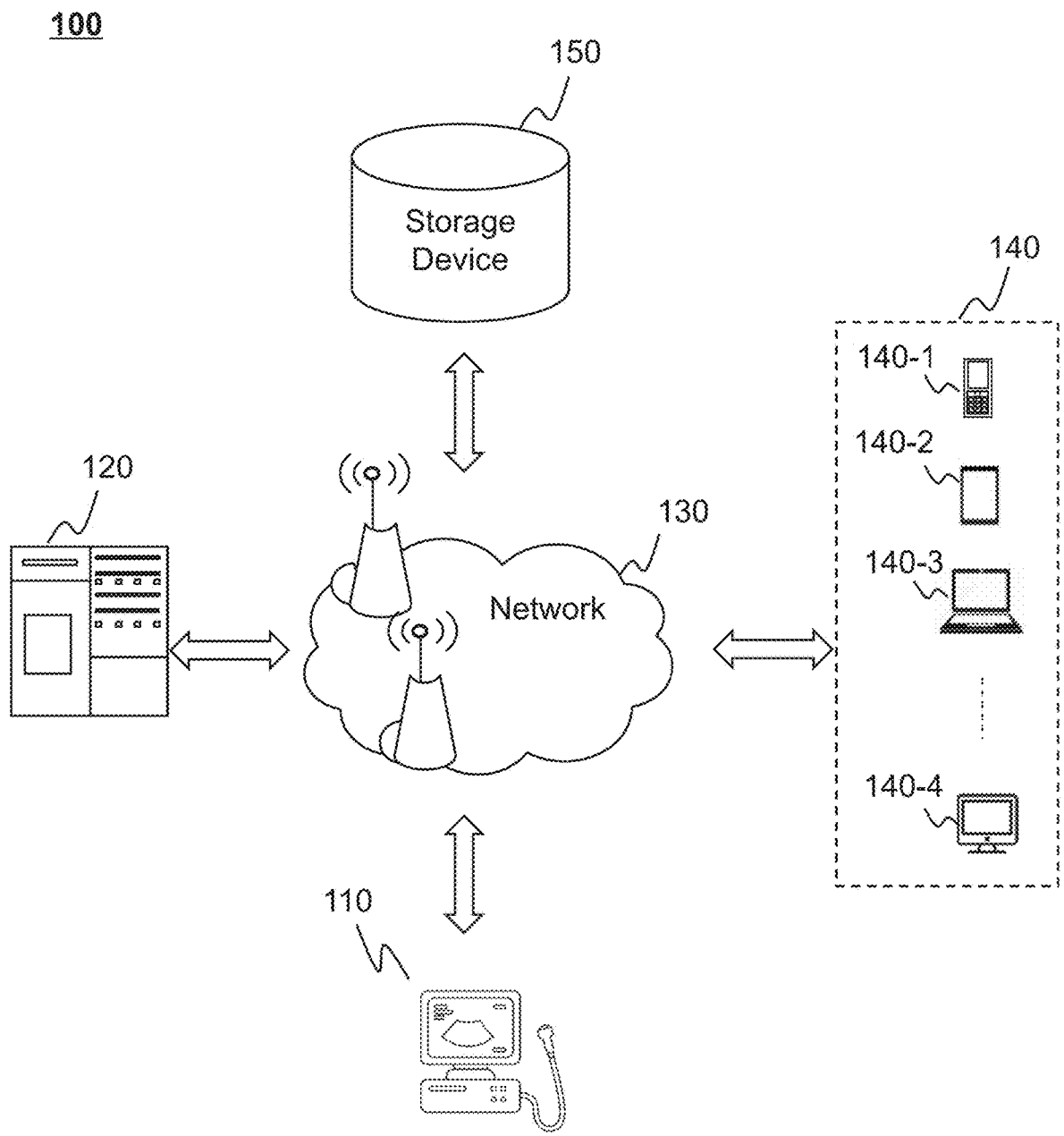
FIG. 1 is a schematic diagram illustrating an application scenario of an exemplary signal processing system according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative effort. Unless obviously obtained from the context or the context illustrates otherwise, the same numeral in the drawings refers to the same structure or operation.

It should be understood that "system," "device," "unit" and/or "module" used herein are one method to distinguish different components, elements, parts, section or assembly of different level in an ascending order. However, the terms may be displaced by another expression if they achieve the same purpose.

As used herein, the singular forms "a," "an," and "the" may be intended to include the plural forms as well, unless the context clearly indicates otherwise. Generally speaking, the terms "comprise," and "include," when used in this specification, specify the presence of stated steps and elements, these steps and elements do not constitute an exclusive list, and the method or the device may also include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

FIG. 1 is a schematic diagram illustrating an application scenario of an exemplary signal processing system according to some embodiments of the present disclosure.

In some embodiments, as shown in FIG. 1, a signal processing system 100 may include an ultrasonic imaging device 110, a processing device 120, a network 130, a terminal device 140, and a storage device 150. In some embodiments, various components in the signal processing system 100 may be connected with each other via the network 130. In some embodiments, some components in the signal processing system 100 may be directly connected with each other.

The ultrasonic imaging device 110 may be used to perform an ultrasonic imaging on a target object (e.g., a subject to be detected). In some embodiments, the target object may include a living organism, a man-made object, etc. In some embodiments, the target object may include a specific part of a body, for example, the head, the neck, the chest, or the like, or any combination thereof. In some embodiments, the target object may include a specific organ, for example, the liver, the kidney, the pancreas, the bladder, the uterus, or the like, or any combination thereof. In some embodiments, the ultrasonic imaging device 110 may obtain ultrasonic imaging data based on physical properties of ultrasonic waves and differences in acoustic properties of the target object. The ultrasonic imaging data may be displayed in a form of a waveform, a curve, or an image, and/or be used to record features associated with the target object. In some embodiments, the ultrasonic imaging device may include a B-ultrasonic device, a color Doppler ultrasonic device, a cardiac color ultrasonic device, a three-dimensional color ultrasonic device, or the like, or any combination thereof. In some embodiments, the ultrasonic imaging data may include an unprocessed raw data file. For example, the ultrasonic imaging data may include sampling data obtained at multiple sampling points. In some embodiments, the ultrasonic imaging data obtained by the ultrasonic imaging device 110 may be non-image data. The non-image data may be sent to the processing device 120 for generating an ultrasonic spectrum image. In some embodiments, the ultrasonic imaging data obtained by the ultrasonic imaging device 110 may be data in a form of an image. The data in the form of the image may be sent to the terminal device 140 for display.

In some embodiments, the ultrasonic imaging device 110 may send the ultrasonic imaging data to the processing device 120, the terminal device 140 and/or the storage device 150 via the network 130 for further processing. For example, the ultrasonic imaging device 110 may send the ultrasonic imaging data to the processing device 120 for processing, such as a demodulation and a low-pass filtering processing, to obtain an initial Doppler blood flow signal. As another example, the processing device 120 may process the initial Doppler blood flow signal by removing interference signals, performing a high-pass filtering, performing a time-frequency conversion, performing a signal splicing, etc., to obtain a target Doppler blood flow signal.

In some embodiments, the ultrasonic imaging device 110 may also include other imaging devices. In some embodiments, the other imaging devices may include an X-ray imaging device, a magnetic resonance imaging device, a nuclear medicine device, a thermal imaging device, a medical optical device, or the like, or any combination thereof.

The processing device 120 may process data and/or information obtained from the ultrasonic imaging device 110, the terminal device 140, and/or the storage device 150. For example, the processing device 120 may obtain multiple sets of initial Doppler blood flow signals, and perform a splicing processing on the multiple sets of initial Doppler blood flow signals, to obtain a target Doppler blood flow signal. As another example, the processing device 120 may perform a post-processing on the target Doppler blood flow signal, to generate an ultrasonic spectrum image, and display the ultrasonic spectrum image. In some embodiments, the ultrasonic spectrum image may be sent to the terminal device 140 and displayed on one or more display devices of the terminal device 140.

In some embodiments, the processing device 120 may be a single server or a server group. The server group may be centralized or distributed. In some embodiments, the processing device 120 may be local or remote. For example, the processing device 120 may access the information and/or data from the ultrasonic imaging device 110, the terminal device 140, and/or the storage device 150 via the network 130. As another example, the processing device 120 may be directly connected to the ultrasonic imaging device 110, the terminal device 140, and/or the storage device 150 to access the information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or any combination thereof.

In some embodiments, the processing device 120 may be a single processing device that communicates with the ultrasonic imaging device 110 and processes data received from the ultrasonic imaging device 110.

The network 130 may include any suitable network that can facilitate the exchange of information and/or data for the signal processing system 100. In some embodiments, one or more components (e.g., the ultrasonic imaging device 110, the processing device 120, the terminal device 140, the storage device 150, etc.) of the signal processing system 100 may exchange information via the network 130. For example, the processing device 120 may receive the ultrasonic imaging data from the ultrasonic imaging device 110 via the network 130. As another example, the processing device 120 may read data stored in the storage device 150 via the network 130.

In some embodiments, the network 130 may be any one or more of a wired network or a wireless network. For example, the network 130 may include a cable network, a fiber optic network, a telecommunications network, the Internet, a local area network (LAN), a wide area network (WAN), a wireless local area network (WLAN), a metropolitan area network (MAN), a public switched telephone network (PSTN), a Bluetooth network, a ZigBee network (ZigBee), a near field communication (NFC), an in-device bus, an in-device line, a cable connection, or the like, or any combination thereof. The network connection among the various parts may adopt one of the above-mentioned methods, or may adopt multiple methods. In some embodiments, the network 130 may be in various topologies such as point-to-point, shared, or central, or a combination of various topologies. In some embodiments, the network 130 may include one or more network access points. For example, the network 130 may include wired or wireless network access points, such as base stations and/or internet exchange points, through which one or more components of the signal processing system 100 may be connected to the network 130 to exchange data and/or information.

The terminal device 140 may communicate with and/or be connected to the ultrasonic imaging device 110, the processing device 120, and/or the storage device 150. For example, the terminal device 140 may send one or more control instructions to the ultrasonic imaging device 110 via the network 130 to control the ultrasonic imaging device 110 to perform an ultrasonic imaging on the target object according to the control instructions. In some embodiments, the terminal device 140 may include a mobile device 140-1, a tablet computer 140-2, a laptop computer 140-3, a desktop computer 140-4, or other devices with input and/or output functions, or any combination thereof. In some embodiments, the terminal device 140 may include an input device, an output device, etc. The input device may include a keyboard, a touch screen, a mouse, a voice device, or the like, or any combination thereof. The output device may include a display, a speaker, a printer, or the like, or any combination thereof. In some embodiments, the terminal device 140 may be part of the processing device 120. In some embodiments, the terminal device 140 may be integrated with the processing device 120 as an operating console of the ultrasonic imaging device 110.

The storage device 150 may store data, instructions, and/or any other information. In some embodiments, the storage device 150 may store a raw data file obtained by the ultrasonic imaging device 110. In some embodiments, the storage device 150 may store data obtained from the ultrasonic imaging device 110, the processing device 120, and/or the terminal device 140. For example, when the raw data file obtained by the ultrasonic imaging device 110 is sent to the processing device 120 for further processing, the processing device 120 may store preliminarily processed data (e.g., initial Doppler blood flow signals) in the storage device 150, or store intermediate processed data (e.g., a first Doppler blood flow signal, a target Doppler blood flow signal, etc.) and final processed data (e.g., an ultrasonic spectrum image) in the storage device 150. As another example, in some embodiments, the storage device 150 may store data and/or instructions that the processing device 120 may execute or use to perform exemplary methods described in the present disclosure.

In some embodiments, the storage device 150 may include a mass memory, a removable memory, a volatile read-write memory, a read-only memory (ROM), or the like, or any combination thereof. In some embodiments, the storage device 150 may be implemented on a cloud platform.

In some embodiments, the storage device 150 may be connected to the network 130 to communicate with at least one other component (e.g., the ultrasonic imaging device 110, the processing device 120, the terminal device 140) of the signal processing system 100. The at least one component of the signal processing system 100 may access the data or instructions stored in the storage device 150 via the network 130. In some embodiments, the storage device 150 may be part of the processing device 120.

It should be noted that the above description is provided for illustrative purposes only and is not intended to limit the scope of this disclosure. Those skilled in the art can make various changes and modifications under the guidance of the contents of the present disclosure. The features, structures, methods, and other features of the exemplary embodiments described in the present disclosure may be combined in various ways to obtain additional and/or alternative exemplary embodiments. For example, the ultrasonic imaging device 110, the processing device 120, and the terminal device 140 may share one storage device 150, or may have their own storage devices. However, these changes and modifications do not depart from the scope of the present disclosure.

Figure 2:
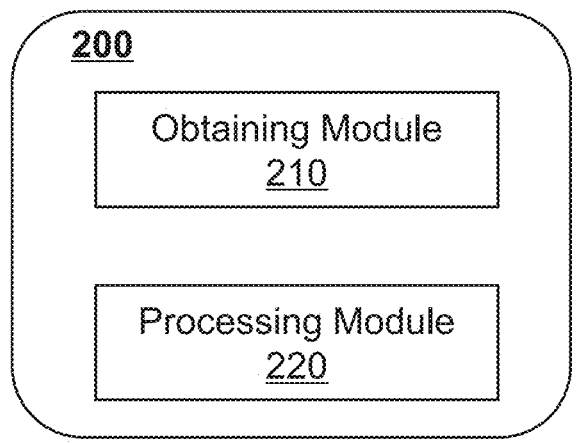
FIG. 2 is a structural block diagram illustrating an exemplary signal processing device according to some embodiments of the present disclosure.

FIG. 2 is a structural block diagram of an exemplary signal processing device according to some embodiments of the present disclosure.

In some embodiments, as shown in FIG. 2, a signal processing device 200 may include an obtaining module 210 and a processing module 220. In some embodiments, the signal processing device 200 may be implemented by the processing device 120.

The obtaining module 210 may be configured to obtain multiple sets of initial Doppler blood flow signals. In some embodiments, the obtaining module 210 may be configured to obtain multiple sets of sampling data in a slow time direction. Each set of sampling data may be obtained by continuous sampling. Different sets of sampling data may be obtained by discontinuous sampling. The each set of sampling data may include first sampling sub-data of multiple sampling points in a fast time direction. For each set of the multiple sets of sampling data, a second signal processing (e.g., a signal demodulation, a low-pass filtering or other processing operations) may be performed on the first sampling sub-data of the multiple sampling points according to the fast time direction, to obtain second sampling sub-data corresponding to the first sampling data. A third processing may be performed on the second sampling sub-data according to the fast time direction (e.g., a summation processing may be performed on the second sampling sub-data in the fast time direction), to obtain a set of initial Doppler blood flow signals.

The processing module 220 may be configured to perform a splicing processing on the multiple sets of initial Doppler blood flow signals, to obtain a target Doppler blood flow signal.

In some embodiments, the processing module 220 may be configured to perform a first processing on the multiple sets of initial Doppler blood flow signals, to obtain a first Doppler blood flow signal. The first processing may include: connecting an end point of a first set of initial signals of the multiple sets of initial Doppler blood flow signals and a starting point of a second set of initial signals of the multiple sets of initial Doppler blood flow signals on a time axis; performing, by multiple filters, a filtering processing on the first Doppler blood flow signal, respectively, to obtain multiple sets of second Doppler blood flow signals; performing a time-frequency signal conversion on the multiple sets of second Doppler blood flow signals, respectively, to obtain multiple sets of third Doppler blood flow signals; for each set of the multiple sets of third Doppler blood flow signals, obtaining a Doppler blood flow signal in a frequency range corresponding to the set of third Doppler blood flow signals, to obtain multiple sets of signals within the multiple preset screening frequency ranges; and combining the multiple sets of signals within the multiple preset screening frequency ranges to obtain the target Doppler blood flow signal.

In some embodiments, the processing module 220 may be configured to perform a filtering processing on the first Doppler blood flow signal using multiple high-pass filters, respectively, to obtain the multiple sets of second Doppler blood flow signals. A cut-off frequency of each high-pass filter may be different. The multiple sets of second Doppler blood flow signals may correspond to different frequency ranges.

In some embodiments, the signal processing device 200 may further include a display module (not shown in FIG. 2). The display module may be used to perform a post-processing on the target Doppler blood flow signal and display the target Doppler blood flow signal. The post-processing may include at least one of an image compression, an image smoothing, or an image enveloping.

More descriptions of the obtaining module 210, the processing module 220, and the display module may be found elsewhere in the present disclosure.

It should be noted that the above description of the signal processing device 200 and modules is merely provided for the purposes of illustration, and not intended to limit the scope of the present disclosure. It should be understood that for those skilled in the art, after understanding the principle of the system, it is possible to combine various modules arbitrarily, or form a subsystem to connect with other modules without departing from this principle. In some embodiments, the obtaining module 210 and the processing module 220 may be different modules in one system, or a single module that can realize the above functions. For example, the modules may share one storage module, or each module may have its own storage module. Such variations are within the protection scope of the present disclosure.

Figure 3:
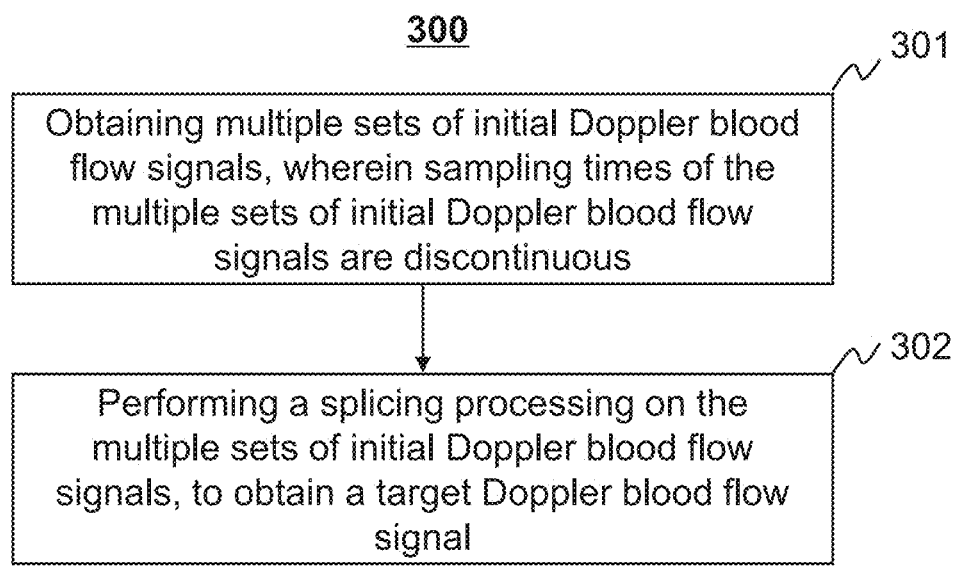
FIG. 3 is a flowchart illustrating an exemplary process for signal processing according to some embodiments of the present disclosure.

FIG. 3 is a flowchart illustrating an exemplary process for signal processing according to some embodiments of the present disclosure. In some embodiments, the process for signal processing may be performed by the signal processing system 100 (e.g., the processing device 120) or the signal processing device 200. For example, the process 300 may be implemented as programs or instructions stored in a storage device (e.g., the storage device 150). When the processing device 120 or the signal processing device 200 executes the programs or the instructions, the process 300 may be implemented. The operations of the illustrated process 300 presented below are intended to be illustrative. In some embodiments, the process may be accomplished with one or more additional operations not described and/or without one or more of the operations discussed. Additionally, the order of the operations of process 300 illustrated in FIG. 3 and described below is not intended to be limiting.

In operation 301, multiple sets of initial Doppler blood flow signals may be obtained. Sampling times of the multiple sets of initial Doppler blood flow signals may be discontinuous. In some embodiments, operation 301 may be performed by the obtaining module 210.

A set of initial Doppler blood flow signals may be referred to as multiple received echo signals returned after a time delay after an ultrasound imaging device (e.g., the ultrasonic imaging device 110) transmits a set of pulse sequences (i.e., PW transmission sequences) to a target object. Spacings of the multiple echo signals may be related to pulse transmission frequencies of the set of pulse sequences. One echo signal may be received every time a pulse is transmitted. In some embodiments, after an echo signal of a previous pulse transmission is received, a next pulse transmission may be performed. Accordingly, after a set of pulse sequence transmissions are completed, the set of initial Doppler blood flow signals including multiple echo signals may be obtained. When the set of pulse sequences are transmitted, a time period from a start time of receiving the echo signal to an end time of receiving all the echo signals to generate the set of initial Doppler blood flow signals may be determined as a sampling time or a generation time. The multiple sets of initial Doppler blood flow signals may be referred to as initial Doppler blood flow signals received after transmitting a set of pulse sequences in different time periods.

The sampling time may be referred to as a time period from a start time of receiving the signal to an end time of receiving all the echo signals when a set of pulse sequences are transmitted. The sampling time may also be referred to as a time period from a start time of transmitting a pulse to an end time of transmitting all pulses when a set of pulse sequences are transmitted. The sampling times of the multiple sets of initial Doppler blood flow signals may be discontinuous. It should be understood that, after a set of pulse sequences are transmitted, B-sequence pulses or C-sequence pulses may be transmitted, and then another set of pulse sequences may be transmitted. During the period of transmitting the B-sequence pulses or the C-sequence pulses, that is, the loss of the initial Doppler blood flow signals, on the time axis may be shown as: two adjacent sets of initial Doppler blood flow signals are distributed at intervals in a time domain (or on the time axis).

In some embodiments, the processing device may obtain the multiple sets of initial Doppler blood flow signals by controlling the ultrasonic imaging device to transmit the pulse sequences to the target object and receive the returned echo signals. For example, when the ultrasonic imaging device transmits a set of pulse sequences A to the target object, a set of initial Doppler blood flow signals a may be obtained. The B-sequence pulses or the C-sequence pulses may then be transmitted, at this time the initial Doppler flow signals is lost. Then, when a set of pulse sequences B are transmitted to the target object, a set of initial Doppler blood flow signals b may be obtained, and so on, the multiple sets of initial Doppler blood flow signals may be obtained.

In some embodiments, the processing device may also obtain the multiple sets of initial Doppler blood flow signals by reading from a storage device or a database, and calling relevant data interfaces.

In some embodiments, the initial Doppler blood flow signals may be the signal data obtained after a series of pre-processing operations are performed. The processing device may also obtain the initial Doppler blood flow signals by performing the series of pre-processing operations on multiple sets of sampling data (also referred to as multiple sets of initial sampling data) obtained by the ultrasonic imaging device. More descriptions of the multiple sets of sampling data and the obtaining of the initial Doppler blood flow signals may be found elsewhere in the present disclosure (e.g., FIG. 5, FIG. 11, and descriptions thereof).

In operation 302, a splicing processing may be performed on the multiple sets of initial Doppler blood flow signals, to obtain a target Doppler blood flow signal. In some embodiments, operation 302 may be performed by the processing module 220.

The splicing processing may include splicing the discontinuous multiple sets of initial Doppler blood flow signals in the time domain, and removing interferences from spliced signals. For example, an end point of a first set of initial Doppler blood flow signals of the multiple sets of initial Doppler blood flow signals and a starting point of a second set of initial Doppler blood flow signals of the multiple sets of initial Doppler blood flow signals may be sequentially connected in a slow time direction. The slow time direction (also referred to as a first direction) may be referred to as a direction of a pulse sequence in a three-dimensional coordinate system. More descriptions for the slow time direction may be found elsewhere in the present disclosure (e.g., FIG. 5 and descriptions thereof). The first set of initial Doppler blood flow signals and the second set of initial Doppler blood flow signals may be referred to as two adjacent sets of initial Doppler blood flow signals in the slow time direction.

The target Doppler blood flow signal may be referred to as a continuous Doppler blood flow signal in the time domain and without interferences, which is obtained by performing a series of processing operations on the multiple sets of initial Doppler blood flow signals and after the interference is removed. The target Doppler blood flow signal may be represented by a time-frequency graph (also referred to as a Doppler blood flow image). The time-frequency graph may clearly describe the change of the frequency (or signal amplitude) of the target Doppler blood flow signal over time, and the amplitude may be represented by color. More descriptions for the time-frequency graph or the Doppler blood flow image may be found elsewhere in the present disclosure (e.g., FIG. 20a, FIG. 20b, FIG. 20c, and descriptions thereof).

Figure 4:
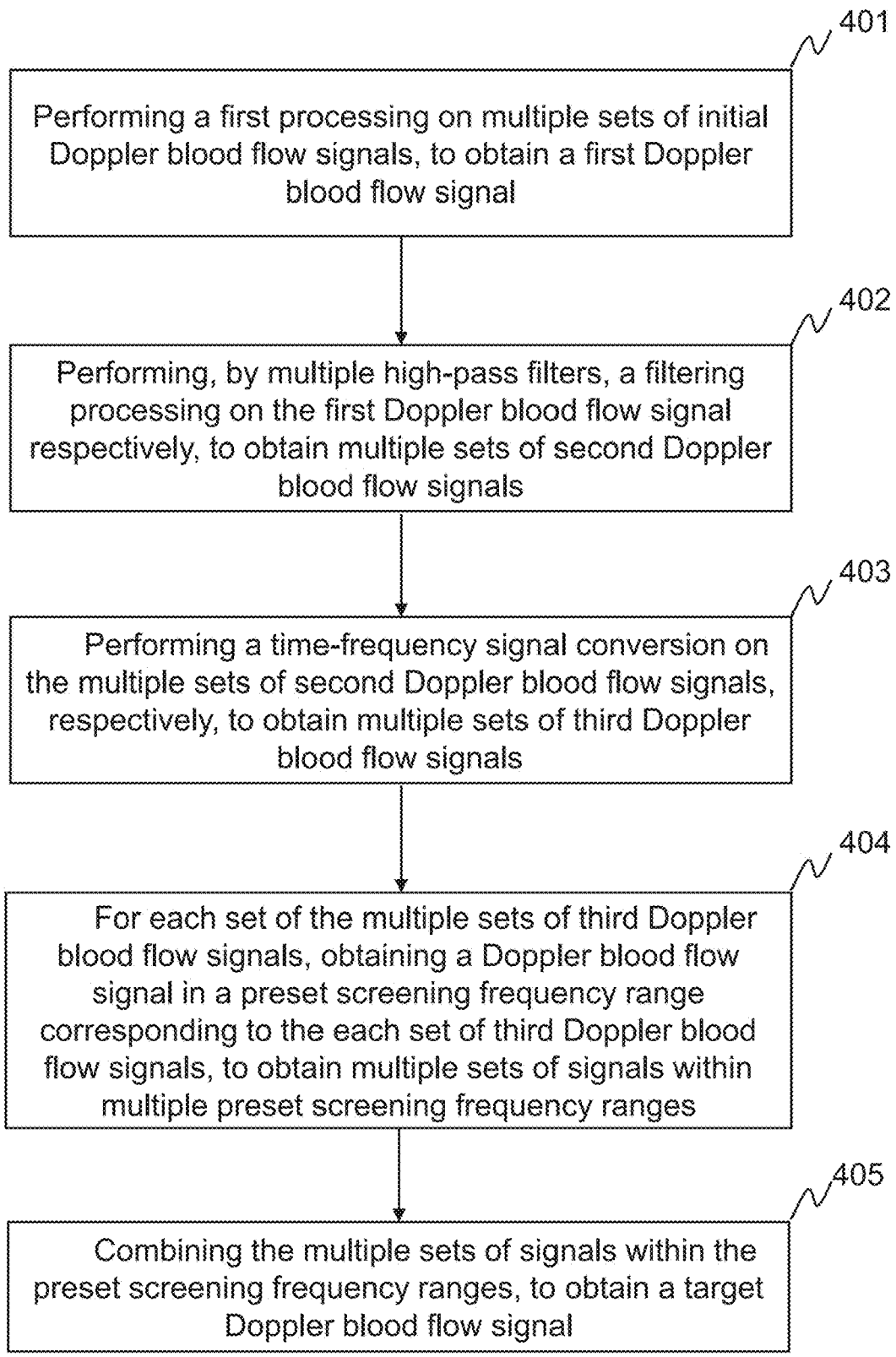
FIG. 4 is a flowchart illustrating an exemplary process for determining a target Doppler blood flow signal according to some embodiments of the present disclosure.

More descriptions for determining the target Doppler blood flow signal may be found elsewhere in the present disclosure (e.g., FIG. 4 and descriptions thereof).

In some embodiments, the processing device may perform a post-processing on the target Doppler blood flow signal and display the target Doppler blood flow signal. The post-processing may include performing a series of image processing operations on the time-frequency graph of the target Doppler blood flow signal. In some embodiments, the post-processing may include at least one of an image compression, an image smoothing, or an image enveloping. A post-processed image may be sent to a terminal device (e.g., terminal device 140) and displayed on a screen of the terminal device.

Compared with prior arts, in the case of massive data loss, the accuracy of the Doppler blood flow signal obtained by data filling may be relatively low, and the quality of the blood flow image may be relatively low. However, the obtained multiple sets of Doppler blood flow signals may be directly processed to generate the final Doppler blood flow image. Firstly, although the data volume of the first Doppler blood flow signal without filling is reduced, the signal can be used to characterize main features in the Doppler blood flow image. Secondly, since there are interferences in amplitudes corresponding to multiple frequency points in a spectrogram corresponding to the first Doppler blood flow signal, by dividing the third Doppler blood flow signal into multiple frequency ranges according to a preset screening frequency range, and screening a part of signal from each frequency range as the target Doppler blood flow signal, the frequency points with interference may be greatly reduced. The Doppler blood flow image may be obtained by sub-frequency range imaging, which may improve the quality of the Doppler blood flow image.

FIG. 4 is a flowchart illustrating an exemplary process for determining a target Doppler blood flow signal according to some embodiments of the present disclosure. In some embodiments, the process for determining the target Doppler blood flow signal may be performed by the signal processing system 100 (e.g., the processing device 120) or the signal processing device 200 (e.g., the processing module 220). For example, the process 400 may be implemented as programs or instructions stored in a storage device (e.g., the storage device 150). When the processing device 120 or the signal processing device 200 executes the programs or the instructions, the process 400 may be implemented. The operations of the illustrated process 400 presented below are intended to be illustrative. In some embodiments, the process may be accomplished with one or more additional operations not described and/or without one or more of the operations discussed. Additionally, the order of the operations of process 400 illustrated in FIG. 4 and described below is not intended to be limiting.

In operation 401, a first processing may be performed on multiple sets of initial Doppler blood flow signals, to obtain a first Doppler blood flow signal.

The first Doppler blood flow signal may be referred to as a time-continuous Doppler blood flow signal obtained after the first processing.

The first processing may include connecting an end point of a first set of initial Doppler blood flow signals of the multiple sets of initial Doppler blood flow signals and a starting point of a second set of initial Doppler blood flow signals of the multiple sets of initial Doppler blood flow signals on a time axis. After the first processing, the continuous first Doppler blood flow signal on the time axis may be obtained. For example, assuming that the multiple sets of initial Doppler blood flow signals only include a set of initial Doppler blood flow signals A and a set of initial Doppler blood flow signals B, the set of initial Doppler blood flow signals A is adjacent to the set of initial Doppler blood flow signals B, a sampling time of the set of initial Doppler blood flow signals A in a PW transmission sequence is (4 ms, 8 ms), wherein 4 ms is a start time of receiving the set of initial Doppler blood flow signals A, and 8 ms is an end time of receiving the set of initial Doppler blood flow signals A; the sampling time of the set of initial Doppler blood flow signals B in the PW transmission sequence is (12 ms, 16 ms), wherein 12 ms is start time of receiving the set of initial Doppler blood flow signals B, and 16 ms is an end time of receiving the set of initial Doppler blood flow signals B, and 8 ms-12 ms refers to a sampling time of other types of transmission sequences (e.g., a B sequence or a C sequence). Accordingly, the first processing on the set of initial Doppler blood flow signals A and the set of initial Doppler blood flow signals B may include connecting the end point of the set of initial Doppler blood flow signals A and the starting point of the set of initial multiple Doppler blood flow signals B on the time axis. The sampling time of the obtained first Doppler blood flow signal may be (4 ms, 12 ms).

In some embodiments, before the first processing is performed on the multiple sets of initial Doppler blood flow signals, the processing device may rank the multiple sets of initial Doppler blood flow signals according to an order of the sampling times of the multiple sets of initial Doppler blood flow signals, such that the end point of the first set of initial Doppler blood flow signals of the multiple sets of initial Doppler blood flow signals and the starting point of the second set of initial Doppler blood flow signals of the multiple sets of initial Doppler blood flow signals can be connected on the time axis, the time between the two adjacent sets of initial Doppler blood flow signals remains continuous, and the time-continuous first Doppler blood flow signal can be obtained.

In operation 402, a filtering processing may be performed on the first Doppler blood flow signal by multiple high-pass filters, respectively, to obtain multiple sets of second Doppler blood flow signals.

The second Doppler blood flow signals may be signal data obtained after a filtering processing is performed on the first Doppler blood flow signal.

In some embodiments, each filter of the multiple filters may perform a filtering processing on the first Doppler blood flow signal, to obtain a set of second Doppler blood flow signals. The multiple filters may perform the filtering processing on the first Doppler blood flow signal, respectively, to obtain the multiple sets of second Doppler blood flow signals. A number of filters may be the same as a number of sets of the obtained second Doppler blood flow signals.

In some embodiments, the multiple filters may be high-pass filters. Accordingly, the filtering processing may be a high-pass filtering processing that can remove low-frequency interference in a signal.

In some embodiments, the processing device may perform the filtering processing on the first Doppler blood flow signal using the multiple high-pass filters, respectively, to obtain the multiple sets of second Doppler blood flow signals. A cut-off frequency of each high-pass filter may be different. For example, the cut-off frequencies of the multiple high-pass filters may be set as $f_1, f_2, \ldots, f_n$, respectively, wherein $f_1 < f_2 < \ldots < f_n$. Merely by way of example, after a first high-pass filter performs the filtering processing on the first Doppler blood flow signal, a frequency of an obtained set of second Doppler blood flow signals may be greater than f1. After a second high-pass filter performs the filtering processing on the first Doppler blood flow signal, a frequency of an obtained set of second Doppler blood flow signals may be greater than $f_2$, and so on. The multiple sets of second Doppler blood flow signals with different frequency ranges may be obtained. That is, a frequency range corresponding to each set of second Doppler blood flow signals of the multiple sets of second Doppler blood flow signals may be different. The frequency range may also be referred to as a frequency band range.

In some embodiments, the cut-off frequencies of the multiple high-pass filters may be determined according to multiple preset frequencies. For example, interval endpoints of the multiple preset frequencies may be determined as the cut-off frequencies of corresponding high-pass filters. The multiple preset frequencies may be referred to as frequency ranges divided according to a certain rule. For example, n−1 preset frequencies may include $[f_1, f_2], [f_2, f_3], \ldots, [f_{n-1}, f_n]$, etc. The cut-off frequencies of the corresponding n high-pass filters may be the interval endpoints of the n−1 preset frequencies, for example, $f_1, f_2, f_3, \ldots, f_{n-1}, f_n$, etc. The multiple preset frequencies may be system default values, experience values, artificial preset values, or the like, or any combination thereof. The multiple preset frequencies may be set according to actual needs, which is not limited in the present disclosure.

In some embodiments, the cut-off frequencies of the multiple high-pass filters may be determined according to a pulse repetition frequency of the initial Doppler blood flow signals. The pulse repetition frequency of the initial Doppler blood flow signals may be referred to as a number of pulse sequences transmitted per unit time. For example, n−1 points may be uniformly or randomly selected within [−PRF/2, PRF/2], and values corresponding to the n−1 points may be used as the cut-off frequencies of the n high-pass filters, wherein PRF represents the pulse repetition frequency of the initial Doppler blood flow signals.

More descriptions for determining the second Doppler blood flow signals may be found elsewhere in the present disclosure (e.g., FIG. 13 and descriptions thereof).

In some embodiments of the present disclosure, the multiple sets of initial Doppler blood flow signals with discontinuous sampling times may be spliced on a time axis to obtain a time-continuous first Doppler blood flow signal. Discontinuities such as steps on a frequency axis may appear in the first Doppler blood flow signal. Before the time-frequency signal conversion is performed, the interference signals may be filtered out using a filter, to achieve the effect of removing the interference of most frequencies, and a total interference of a subsequent combination of the multiple sets of signals may be effectively reduced.

In operation 403, a time-frequency signal conversion may be performed on the multiple sets of second Doppler blood flow signals, respectively, to obtain multiple sets of third Doppler blood flow signals.

The time-frequency signal conversion may be referred to as an operation of transforming a signal between a time domain and a frequency domain. For example, the time-frequency signal conversion may include transforming the signal from the time domain to the frequency domain, or transforming the signal from the frequency domain to the time domain. In some embodiments, the processing device may perform the time-frequency signal conversion on the second Doppler blood flow signals according to a preset time-frequency conversion algorithm.

In some embodiments, the preset time-frequency conversion algorithm may include a short-time Fourier transform. In the short-time Fourier transform, by setting a window length and a step size of a window function, the window may slide in a slow time direction, and frequency domain signals corresponding to different sampling points may be determined. The slow time direction (also referred to as the first direction) may be referred to as a direction of a pulse sequence in the three-dimensional coordinate system. More descriptions for the slow time direction may be found elsewhere in the present disclosure (e.g., FIG. 5 and descriptions thereof). The window length may be referred to as a number of sampling points in the slow time direction. The step size may be referred to as a number of sampling points between two adjacent windows when the window slides in the slow time direction. In some embodiments, the window length may be less than or equal to a number of sampling points of the multiple sets of initial Doppler blood flow signals.

In some embodiments, the window length may be determined based on the sampling times of the multiple sets of initial Doppler blood flow signals and the pulse repetition frequency of each set of initial Doppler blood flow signals. For example, the window length may be less than or equal to the number of sampling points of the multiple sets of initial Doppler blood flow signals in the slow time direction (the number of sampling points in the slow time direction may be determined by multiplying the pulse repetition frequency by a slow time sampling duration). The sampling time and the pulse sequence of each set of initial Doppler blood flow signals may be the same.

In some embodiments, the window length and the step size may be manually adjusted. The window length and the step size may also be automatically adjusted by the system according to the time-frequency signal conversion.

In some embodiments, the preset time-frequency conversion algorithm may also include, but not limited to, a Fourier transform, a Laplace transform, a Z transform, or the like, which is not limited in the present disclosure.

The third Doppler blood flow signal may be signal data obtained by performing the time-frequency signal conversion on the second Doppler blood flow signal. For example, the second Doppler blood flow signal may be a time domain signal, and the third Doppler blood flow signal may be a frequency domain signal obtained by converting the second Doppler blood flow signal from the time domain to the frequency domain.

In some embodiments, for each set of multiple sets of second Doppler blood flow signals, the processing device may perform the time-frequency signal conversion on the each set of second Doppler blood flow signals according to the preset time-frequency conversion algorithm, to generate the multiple sets of third Doppler blood flow signals. For example, the multiple sets of second Doppler blood flow signals may include $M_1, M_2, \ldots, M_n$. A set of third Doppler blood flow signals $N_1$ may be generated by performing the time-frequency signal conversion on a set of second Doppler blood flow signals, and so on, to obtain the multiple sets of third Doppler blood flow signals $N_1, N_2, \ldots, N_n$.

In some embodiments of the present disclosure, by performing a short-time Fourier transform on the signal, the signal may be analyzed segment by segment to obtain a set of local "spectrums" of the signal. A time-frequency signal conversion may be performed on the signal by setting a certain window length and a step size, and non-stationary signals (e.g., signals lost in the time domain) may be removed in the time domain, which may facilitate a short-term time stationary signal analysis.

In operation 404, for each set of the multiple sets of third Doppler blood flow signals, a Doppler blood flow signal in a preset screening frequency range corresponding to the each set of third Doppler blood flow signals may be obtained, to obtain multiple sets of signals within multiple preset screening frequency ranges.

The preset screening frequency range may be used to screen a signal within the multiple preset screening frequency ranges from the third Doppler blood flow signals. The signal within the multiple preset screening frequency ranges (also referred to as a fourth Doppler blood flow signal) may be a part of signals within a frequency range of the third Doppler blood flow signals. For example, the preset screening frequency range of a set of third Doppler blood flow signals A may be $[f_1, f_2]$, and signals within the frequency range $[f_1, f_2]$ may be screened out.

In some embodiments, the preset screening frequency ranges corresponding to the multiple sets of third Doppler blood flow signals may have no intersection. That is, each set of third Doppler blood flow signals may correspond to different preset screening frequency ranges. For example, a preset screening frequency range corresponding to a set of third Doppler blood flow signals A may be $[f_1, f_2]$, and a preset screening frequency range corresponding to a set of third Doppler blood flow signals B may be $[f_3, f_4]$, etc.

In some embodiments, a union of the preset screening frequency ranges corresponding to the multiple sets of third Doppler blood flow signals may be determined based on the pulse repetition frequencies of the initial Doppler blood flow signals.

In some embodiments, the preset screening frequency ranges corresponding to the each set of third Doppler blood flow signals may be determined based on the cut-off frequencies of the multiple high-pass filters and the pulse repetition frequencies of the initial Doppler blood flow signals.

Merely by way of example, the multiple sets of third Doppler blood flow signals may include $N_1, N_2, \ldots, N_n$. The cut-off frequencies of the multiple high-pass filters may include $f_1, f_2, \ldots, f_n$, respectively. The preset screening frequency ranges corresponding to $N_1$ may be $[-f_2, -f_1]$ and $[f_1, f_2]$, the preset screening frequency ranges corresponding to $N_2$ may be $[-f_4, -f_3]$ and $[f_3, f_4]$, and so on, the preset screening frequency ranges corresponding to $N_n$ may be $[-PRF/2, -f_n]$ and $[f_n, PRF/2]$. The union of the preset screening frequency ranges corresponding to the n sets of third Doppler blood flow signals may cover a frequency range of a set of initial Doppler blood flow signals. Further, the Doppler blood flow signals within the preset screening frequency ranges $[-f_2, -f_1]$ and $[f_1, f_2]$ corresponding to $N_1$ may be obtained to obtain a set of signals $G_1$ within the ranges, the Doppler blood flow signals within the preset screening frequency ranges $[-f_4, -f_3]$ and $[f_3, f_4]$ corresponding to $N_2$ may be obtained to obtain a set of signals $G_2$ within the ranges, ..., and the Doppler blood flow signals within the preset screening frequency ranges $[-PRF/2, -f_n]$ and $[f_n, PRF/2]$ corresponding to $N_n$ may be obtained to obtain a set of signals $G_n$ within the ranges, and multiple sets of signals $G_1, G_2, \ldots, G_n$ within the ranges may be obtained.

Figure 16:
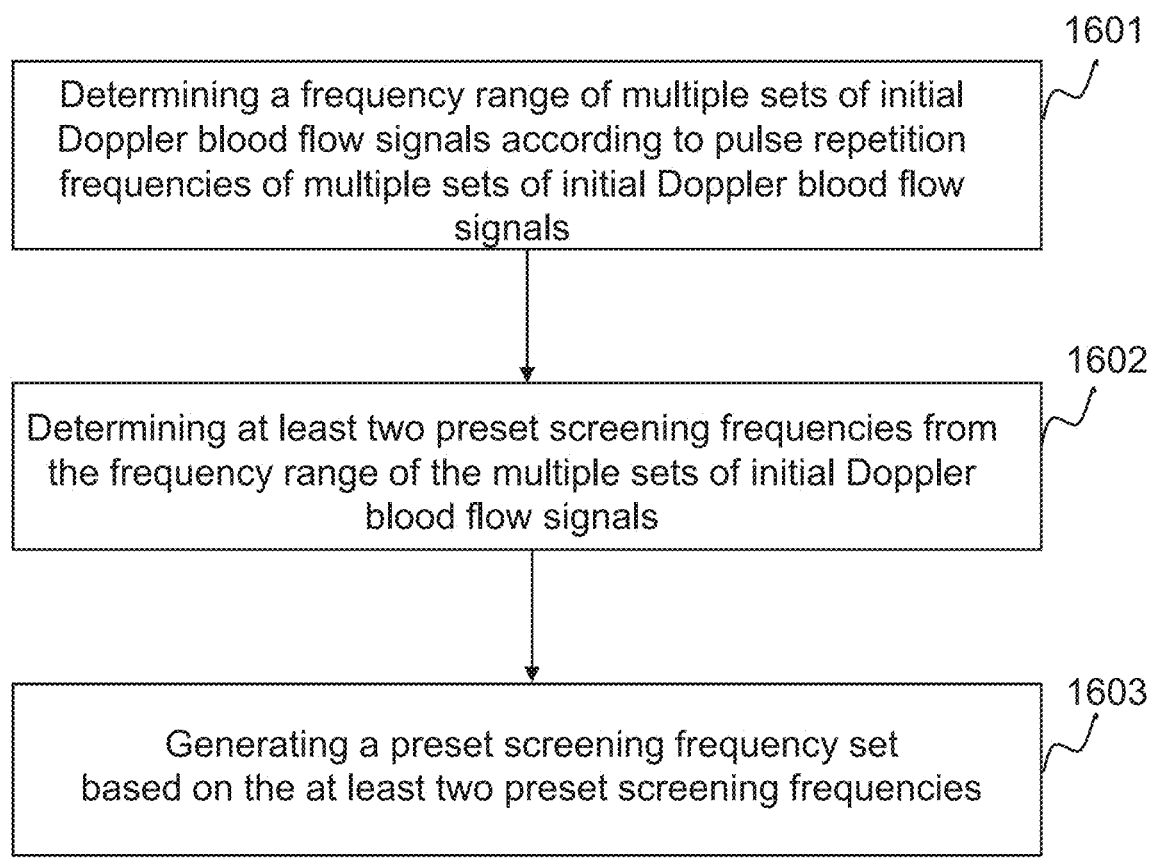
FIG. 16 is a flowchart illustrating an exemplary process for determining a preset screening frequency set according to some embodiments of the present disclosure.

More descriptions for determining the preset screening frequency ranges may be found elsewhere in the present disclosure (e.g., FIG. 16 and descriptions thereof).

In operation 405, the multiple sets of signals within the preset screening frequency ranges may be combined, to obtain a target Doppler blood flow signal.

The target Doppler blood flow signal may be a Doppler blood flow signal obtained after a series of processing operations. In some embodiments, the processing device may combine the multiple sets of signals within the preset screening frequency ranges according to the frequency sizes of the multiple sets of signals within the preset screening frequency ranges, to obtain the target Doppler blood flow signal.

More descriptions for obtaining the target Doppler blood flow signal may be found elsewhere in the present disclosure (e.g., FIG. 7, FIG. 12, FIG. 14, FIG. 15, and descriptions thereof).

In operation 402, the process of performing the filtering processing on the first Doppler blood flow signal by the multiple filters, respectively, may be referred to as a filtering processing. In some embodiments, the processing device may perform multiple filtering processing operations on the first Doppler blood flow signal using the multiple high-pass filters, respectively. The multiple sets of second Doppler blood flow signals may be obtained after a filtering processing operation. Operations 403-405 may be performed on the multiple sets of second Doppler blood flow signals obtained by performing the multiple filtering processing operations, respectively, to obtain the multiple target Doppler blood flow signals. Furthermore, when the processing device performs a post-processing operation on the multiple target Doppler blood flow signals and displays the multiple target Doppler blood flow signals, the processing device may perform an average operation on multiple time-frequency graphs of the multiple target Doppler blood flow signals, to obtain an average combined time-frequency graph. Finally, the processing device may perform the post-processing operation on the average combined time-frequency graph and display the average combined time-frequency graph.

In some embodiments, the multiple high-pass filters used in each filtering processing may be the same, and the cut-off frequencies of the multiple high-pass filters used in each filtering processing may be different. For example, n−1 points may be randomly selected within [−PRF/2, PRF/2], and values corresponding to the n−1 points may be used as the cut-off frequencies of the n high-pass filters, wherein PRF may represent the pulse repetition frequency of the initial Doppler blood flow signals. Due to different random selection modes, the cut-off frequencies of the multiple high-pass filters used in each filtering processing may be different. In some embodiments, the multiple high-pass filters used in each filtering processing may be different, and the cut-off frequencies of the multiple high-pass filters used in each filtering processing may be different. For example, n_i−1 points may be randomly selected within [−PRF/2, PRF/2], and values corresponding to the n_i−1 points may be used as the cut-off frequencies of the n_i high-pass filters. Due to different random selection modes, the cut-off frequencies of the multiple high-pass filters used in each filtering processing may be different. As another example, n_i−1 points may be evenly selected within [−PRF/2, PRF/2]. Since the multiple high-pass filters used in each filtering processing is different (i.e., n is different), the cut-off frequencies of the multiple high-pass filters used in each filtering processing may be different.

FIG. 5 is a flowchart illustrating an exemplary process for obtaining initial Doppler blood flow signals according to some embodiments of the present disclosure. In some embodiments, the process for obtaining initial Doppler blood flow signals may be performed by the signal processing system 100 (e.g., the processing device 120) or the signal processing device 200 (e.g., the obtaining module 210). For example, the process 500 may be implemented as programs or instructions stored in a storage device (e.g., the storage device 150). When the processing device 120 or the signal processing device 200 executes the programs or the instructions, the process 500 may be implemented. The operations of the illustrated process 500 presented below are intended to be illustrative. In some embodiments, the process may be accomplished with one or more additional operations not described and/or without one or more of the operations discussed. Additionally, the order of the operations of process 500 illustrated in FIG. 5 and described below is not intended to be limiting.

It should be noted that the initial Doppler blood flow signals obtained by the following process may be a set of initial Doppler blood flow signals obtained after performing a series of processing operations on multiple sets of sampling data obtained within one sampling time.

In operation 501, multiple sets of sampling data may be obtained in a slow time direction. Each set of sampling data may include first sampling sub-data of multiple sampling points in a fast time direction.

The slow time direction (also referred to as the first direction) may be referred to as a direction of a pulse sequence in a three-dimensional coordinate system. In some embodiments, the slow time direction may be determined based on a direction of a time sequence of multiple transmitted pulse sequences in the three-dimensional coordinate system.

Figure 9:
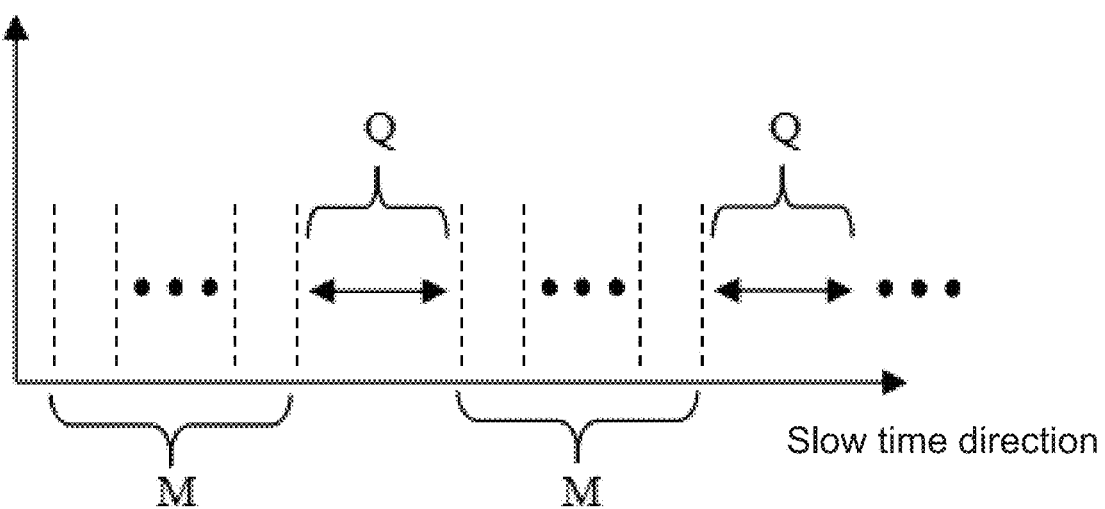
FIG. 9 is a schematic diagram illustrating an exemplary fast time direction and an exemplary slow time direction according to some embodiments of the present disclosure.

The fast time direction (also referred to as a second direction) may be referred to as a direction of a signal echo time in a three-dimensional coordinate system. The signal echo time may be referred to as a time from transmitting a pulse sequence to receiving an echo signal. The fast time direction may be referred to as a detection depth direction of a target object. In some embodiments, the fast time direction may be determined according to the direction of the signal echo time (i.e., a second time sequence) from transmitting the pulse sequence to receiving the echo signal in the three-dimensional coordinate system. As shown in FIG. 9, the horizontal axis represents a slow time direction, the vertical axis represents a fast time direction, and the z axis (not shown in the figure) represents a frequency of a signal.

Figure 8:
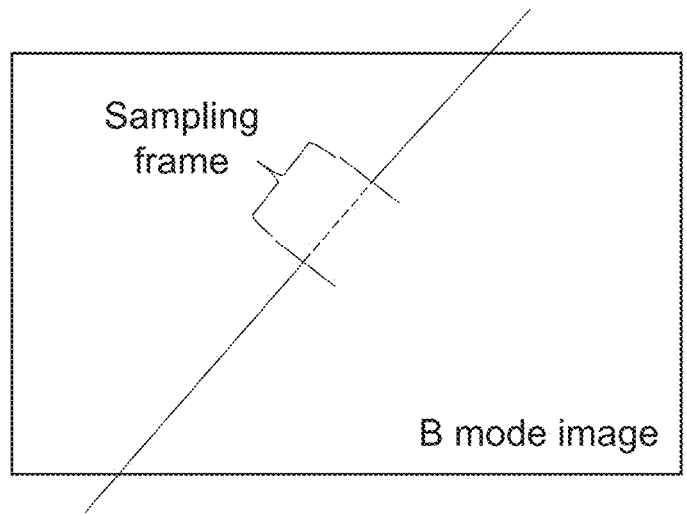
FIG. 8 is a schematic diagram illustrating an exemplary sampling frame according to some embodiments of the present disclosure.

The sampling data (also referred to as initial sampling data) may be referred to as unprocessed raw data obtained when the pulse sequence is transmitted at multiple sampling points. The multiple sampling points may be multiple points determined in a sampling frame. As shown in FIG. 8, the sampling frame may be a specified sampling frame on a B mode image acquired under a B-mode pulse.

Each set of sampling data may be obtained by continuous sampling, i.e., a set of sampling data may be a same set of sampling data obtained by transmitting a pulse sequence. Different sets of sampling data may be obtained by discontinuous samplings, i.e., different sets of sampling data may be different sets of sampling data obtained by transmitting different pulse sequences.

In some embodiments, each set of sampling data may include first sampling sub-data (also referred to as initial sampling sub-data) of multiple sampling points in the fast time direction.

In some embodiments, the processing device may transmit pulse sequences in the PW mode multiple times in the slow time direction for multiple sampling points in the sampling frame, and perform a beamforming, to obtain the multiple sets of sampling data.

In operation 502, for each set of the multiple sets of sampling data, a second signal processing may be performed on the first sampling sub-data of the multiple sampling points according to the fast time direction, to obtain second sampling sub-data corresponding to the first sampling sub-data.

The second processing may be referred to as a processing operation performed on the first sampling sub-data. For example, the second processing may include a processing operation such as a signal demodulation, a low-pass filtering, etc. The second sampling sub-data may correspond to the multiple sampling points.

In some embodiments, for each set of the multiple sets of sampling data, the processing device may perform a processing operation such as a signal demodulation, a low-pass filtering, etc., on the first sampling sub-data of the multiple sampling points according to the fast time direction, to generate the second sampling sub-data corresponding to the first sampling sub-data. The signal demodulation may include performing a demodulation processing on the first sampling sub-data to remove carrier signals and restore base frequency signals. The low-pass filtering may include removing high-frequency signals in the first sampling sub-data by a low-pass filter.

In some embodiments, the second processing may also include other processing operations for performing a pre-processing on the signal. For example, the second processing may also include a signal amplification, a signal modulation, etc.

In operation 503, a third processing may be performed on the second sampling sub-data according to the fast time direction, to obtain a set of initial Doppler blood flow signals.

The third processing may be referred to as a processing operation performed on the second sampling sub-data. For example, the third processing may include performing a summation processing on the second sampling sub-data in the fast time direction, for example, adding the echo signals obtained in the same time point by point.

The multiple sets of initial Doppler blood flow signals may be obtained by performing the processing operations on each set of the multiple sets of sampling data.

Figure 11:
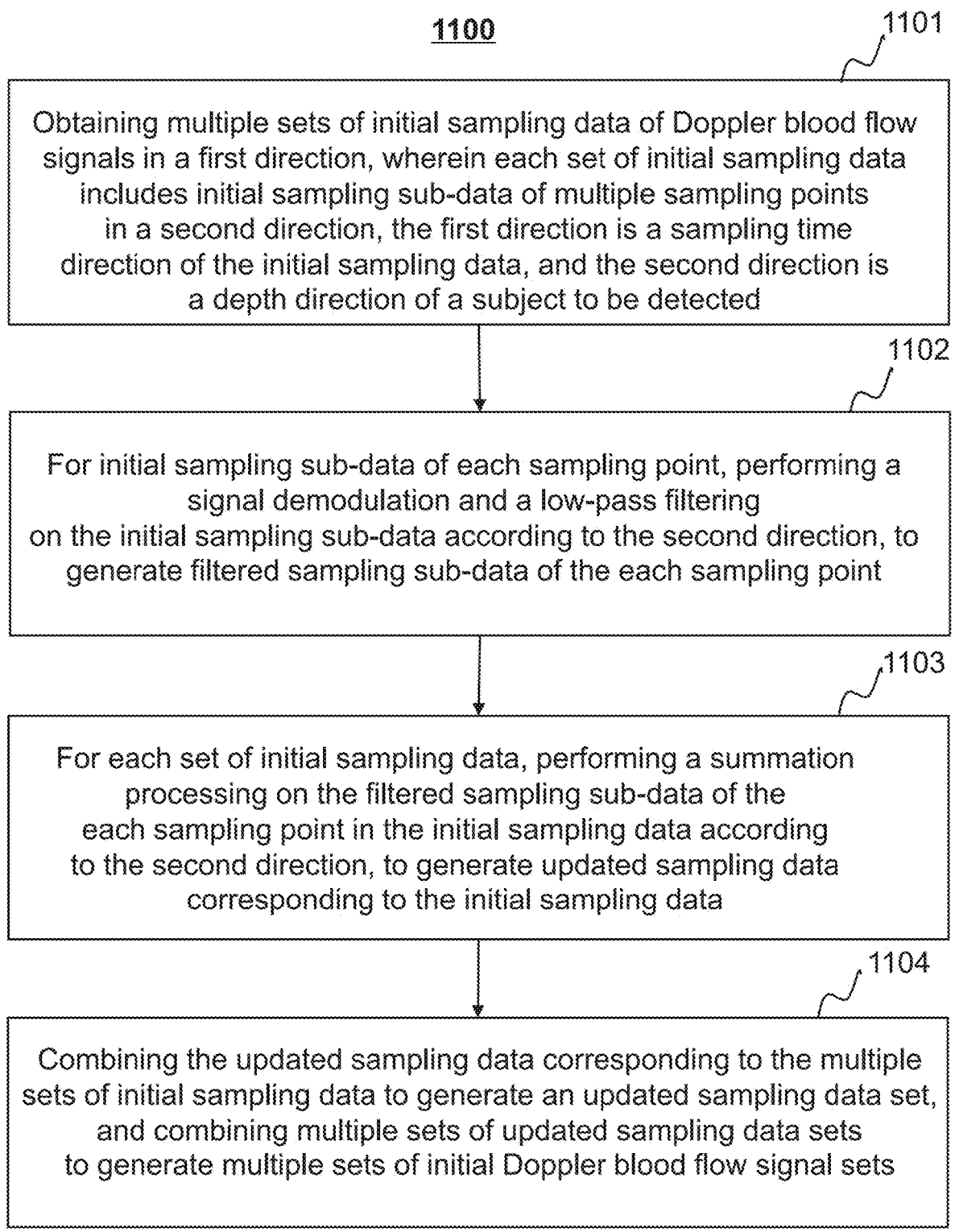
FIG. 11 is a flowchart illustrating an exemplary process for generating multiple sets of initial Doppler blood flow signals according to some embodiments of the present disclosure.

More descriptions for obtaining the multiple sets of initial Doppler blood flow signals may be found elsewhere in the present disclosure (e.g., FIG. 11 and descriptions thereof).

Figure 6:
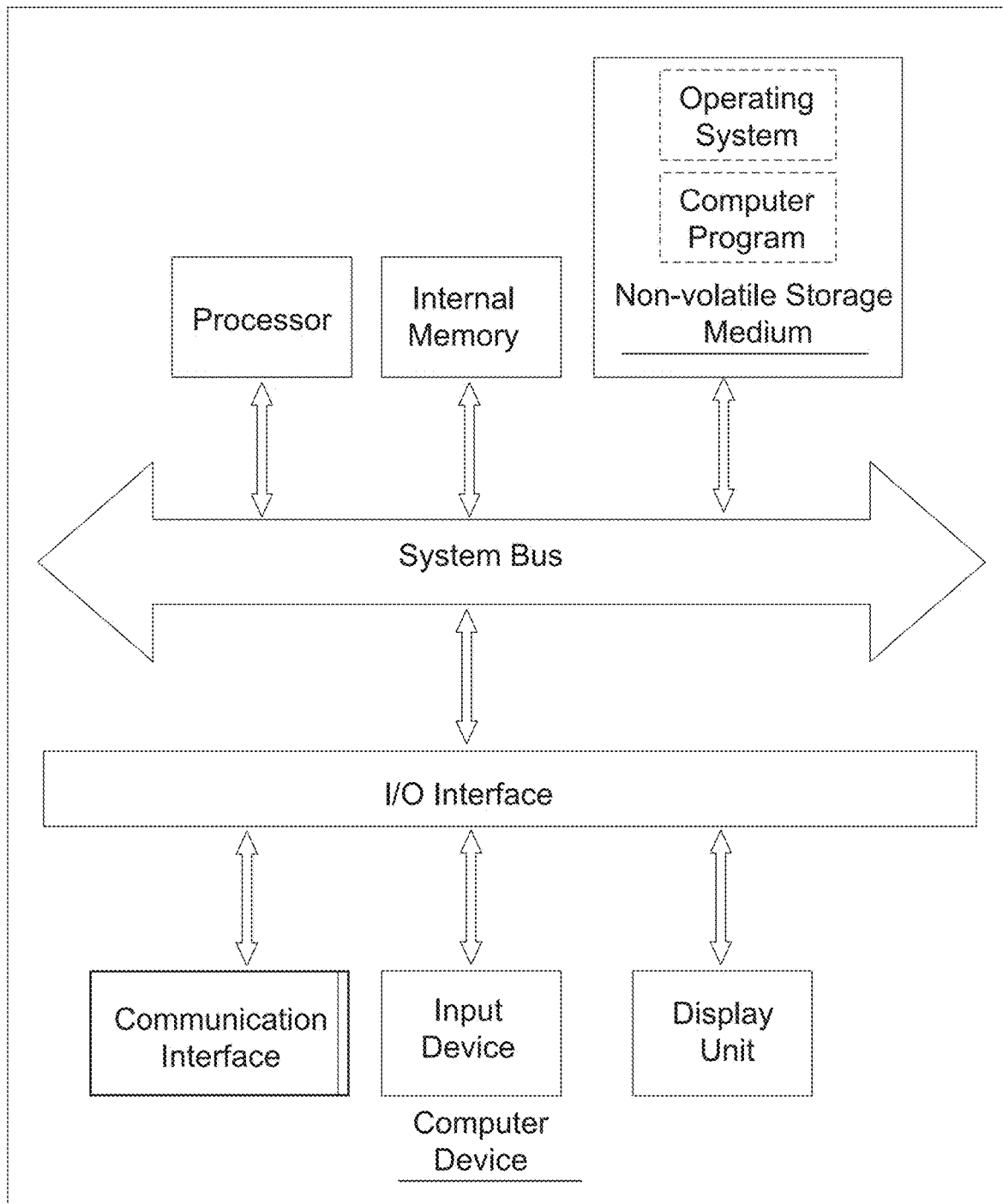
FIG. 6 is an internal structural diagram illustrating an exemplary computer device according to some embodiments of the present disclosure.

FIG. 6 is an internal structure diagram illustrating an exemplary computer device according to some embodiments of the present disclosure. As shown in FIG. 6, the computer device may include a processor, a memory, a communication interface, a display screen, and an input device connected with each other via a system bus. The processor of the computer device may be used to provide computing and control capabilities. The memory of the computer device may include a non-volatile storage medium and an internal memory. The non-volatile storage medium may store an operating system and computer programs. The internal memory may provide an environment for the operation of the operating system and the computer programs in the non-volatile storage medium. The communication interface of the computer device may be used for a wired or wireless communication with an external terminal. The wireless mode may be realized through WIFI, a mobile cellular network, a near field communication (NFC), or other technologies. The process for signal processing may be implemented when the computer programs are executed by the processor. The display screen of the computer device may be a liquid crystal display screen or an electronic ink display screen. The input device of the computer device may be a touch layer covered on the display screen, a button, a trackball or a touch pad arranged on a casing of the computer device, an external keyboard, a touchpad, a mouse, or the like.

Those skilled in the art should be understood that the structure shown in FIG. 6 is only a block diagram of a part of the structure related to the embodiments of the present disclosure, and does not constitute a limitation on the terminal device to which the embodiments of the present disclosure are applied. Optionally, the terminal device may include more or fewer components than the components shown in the figures, the components shown in the figures may be combined, or the terminal device may have different component arrangements.

It should be noted that the execution subject of the embodiments of the present disclosure may be the computer device or the signal processing device. In the following embodiments, the computer device may be used as the execution subject.

FIG. 7 is a flowchart illustrating an exemplary process for signal processing according to some embodiments of the present disclosure. As shown in FIG. 7, the process 700 may include the following operations.

In operation 701, multiple sets of initial Doppler blood flow signals may be obtained, and the multiple sets of initial Doppler blood flow signals may be ranked according to generation times of the multiple sets of initial Doppler blood flow signals, to generate a first Doppler blood flow signal, such that a time of the first Doppler blood flow signal is continuous.

Usually, an ultrasonic device may display the anatomical structure and the blood flow condition of human tissue in real time using different imaging modes. When synchronization of multiple imaging modes is adopted, i.e., when image signals are acquired by different imaging modes and displayed simultaneously, the anatomical structure of human tissue may be obtained by an imaging mode B (also referred to as a B mode for brevity), and the blood flow condition may be characterized by the Doppler blood flow signal obtained by a pulse Doppler imaging mode (also referred to as a PW mode for brevity) or a color blood flow imaging mode (also referred to as a C mode for brevity). Usually, the synchronization of multiple imaging modes including the PW mode may include the synchronization of the PW mode and the B mode, the synchronization of the PW mode and the C mode, the synchronization of the PW mode, the B mode, and the C mode, etc.

In the case of the synchronization of multiple imaging modes, multiple sets of initial Doppler blood flow signals may be obtained. Specifically, before the initial Doppler blood flow signals are obtained, a B mode image may be obtained using the B mode. The B mode image may be displayed on a display interface. The user may set a sampling frame in the B mode image on the display interface. The sampling frame may be used to select a blood vessel image in the B mode image. As shown in FIG. 8, dotted lines may represent a blood vessel image, and solid lines may represent a main propagation direction of an ultrasonic wave. Therefore, a probe of the ultrasonic device may be controlled to electronically focus based on the sampling frame, so as to acquire the initial Doppler blood flow signals in the sampling frame.

After the multiple sets of initial Doppler blood flow signals are obtained, there is a signal gap between the multiple sets of initial Doppler blood flow signals, i.e., a time period between two adjacent sets of initial Doppler blood flow signals may be used for B mode and/or C mode signal acquisition. As shown in FIG. 9, M represents a set of initial Doppler blood flow signals obtained via beamforming, and Q represents a set of signals acquired in the B mode and/or the C mode. In addition, as shown in FIG. 9, the horizontal axis represents the slow time direction, and the vertical axis represents the fast time direction. Specifically, the probe may transmit a signal, and a time period during which an echo signal is received for the transmitted signal may be referred to as the fast time direction, i.e., each dotted line in FIG. 9 represents an echo signal. The probe may transmit the signal, receive the signal, then transmit the signal again, and receive the signal again, and so on. A time interval between two adjacent signal receiving times or two adjacent signal transmitting times may be referred to as a pulse repetition time, i.e., the slow time direction.

Figure 10:
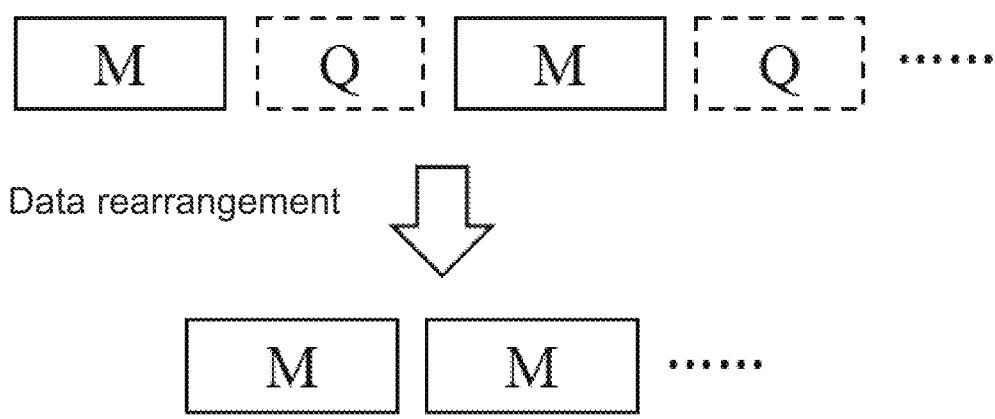
FIG. 10 is a schematic diagram illustrating an exemplary data rearrangement according to some embodiments of the present disclosure.

Furthermore, the first Doppler blood flow signal may be generated by ranking the multiple sets of obtained initial Doppler blood flow signals according to the generation times of the multiple sets of initial Doppler blood flow signals. As shown in FIG. 10, the continuous first Doppler blood flow signal may be obtained after a data rearrangement operation is performed on the multiple sets of initial Doppler blood flow signals. Optionally, the multiple sets of initial Doppler blood flow signals M may be ranked according to the order of generation times by deleting signals Q obtained in the B mode and/or C mode. The time corresponding to the initial Doppler blood flow signals M may be modified so that the time between two adjacent sets of initial Doppler blood flow signals M remains continuous. The first Doppler blood flow signal may then be obtained, i.e., the time of the obtained first Doppler blood flow signal may be continuous.

In operation 702, a preset screening frequency set may be determined according to pulse repetition frequencies of the initial Doppler blood flow signals. The preset screening frequency set may include at least two preset screening frequencies.

The pulse repetition frequency of the initial Doppler blood flow signals may be referred to as a number of pulses transmitted per unit time. The pulse repetition frequency may be determined as the maximum blood flow frequency. The minimum blood flow frequency may be set as 0. A blood flow frequency range may be obtained based on the minimum blood flow frequency and the maximum blood flow frequency.

When determining the preset screening frequencies in the preset screening frequency set, at least two frequency values may be selected from the blood flow frequency range according to a preset rule, and the at least two selected frequency values may be determined as the preset screening frequencies. At least two frequency values may be arbitrarily selected from the blood flow frequency range, and the at least two selected frequency values may be determined as the preset screening frequencies. Other selection modes may be used to select the at least two frequency values as the preset screening frequencies, which is not specifically limited in this embodiment. The preset screening frequency set may be obtained based on the at least two selected preset screening frequencies.

In operation 703, a target Doppler blood flow signal may be screened from the first Doppler blood flow signal based on the preset screening frequencies in the preset screening frequency set, and a Doppler blood flow image may be generated based on the target Doppler blood flow signal.

The first Doppler blood flow signal may be a time domain signal. A time frequency signal corresponding to the first Doppler blood flow signal may be obtained by converting the first Doppler blood flow signal. The time frequency signal corresponding to the first Doppler blood flow signal may also be obtained by performing the filtering operation or other data processing operations on the first Doppler blood flow signal, and performing the conversion operation on a processed first Doppler blood flow signal. The time frequency signal may represent the change of frequency with time. Therefore, a signal corresponding to the preset screening frequency may be screened from the time frequency signal based on the preset screening frequencies in the preset screening frequency set, and the screened signal may be determined as the target Doppler blood flow signal. The target Doppler blood flow signal may be processed, and the Doppler blood flow image may be generated based on the processed target Doppler blood flow signal. The processing operation may include converting the time frequency signal into the change of blood flow velocity with time, an image processing operation such as an image smoothing operation, a denoising operation, etc.

In some embodiments, the multiple sets of initial Doppler blood flow signals may be obtained. The multiple sets of initial Doppler blood flow signals may be ranked according to the generation times of the multiple sets of initial Doppler blood flow signals, and the first Doppler blood flow signal may be generated. There may be a signal gap between the multiple sets of initial Doppler blood flow signals. The preset screening frequency set may be determined according to the pulse repetition frequencies of the initial Doppler blood flow signals. The preset screening frequency set may include the at least two preset screening frequencies. The target Doppler blood flow signal may be screened from the first Doppler blood flow signal based on the preset screening frequencies in the preset screening frequency set. The Doppler blood flow image may be generated based on the target Doppler blood flow signal. Compared with prior arts, in the case of massive data loss, the accuracy of the Doppler blood flow signal obtained by data filling may be relatively low, and the quality of the blood flow image may be relatively low. However, the obtained multiple sets of Doppler blood flow signals may be directly processed to generate the final Doppler blood flow image. Firstly, although the data volume of the first Doppler blood flow signal without filling is reduced, the signal can be used to characterize main features in the Doppler blood flow image. Secondly, since there are interferences in amplitudes corresponding to multiple frequency points in a spectrogram corresponding to the first Doppler blood flow signal, by dividing the first Doppler blood flow signal into multiple frequency ranges according to a preset screening frequency range, and screening a part of signal from each frequency range as the target Doppler blood flow signal, the frequency points with interference may be greatly reduced. The Doppler blood flow image may be obtained by sub-frequency range imaging, which may improve the quality of the Doppler blood flow image FIG. 11 is a flowchart illustrating an exemplary process for generating multiple sets of initial Doppler blood flow signals according to some embodiments of the present disclosure. FIG. 11 may relate to a possible process for generating the multiple sets of initial Doppler blood flow signal sets. As shown in FIG. 11, the process 1100 may include the following operations.

In operation 1101, multiple sets of initial sampling data of Doppler blood flow signals in a first direction may be obtained. Each set of initial sampling data may include initial sampling sub-data of multiple sampling points in a second direction. The first direction may be a sampling time direction of the initial sampling data. The second direction may be a depth direction of a subject to be detected.

Refer to FIG. 9, the first direction may be the sampling time direction of the initial sampling data, i.e., the slow time direction represented by the horizontal axis. The second direction may be the depth direction of the subject to be detected, i.e., the fast time direction represented by the vertical axis. The multiple sets of initial sampling data of the Doppler blood flow signals may be obtained in the first direction, i.e., the M including multiple dotted lines shown in FIG. 9 may represent a set of initial sampling data. Each set of initial sampling data may include initial sampling sub-data of multiple sampling points in the second direction, i.e., in each set of initial sampling data M, each dotted line may include the initial sampling sub-data of multiple sampling points. Each dotted line may represent echo signals in a time period in the fast time direction. The echo signals may be a series of signals with a certain depth. The echo signals may contain multiple sampling points. A number of sampling points on each dotted line may be the same.

In operation 1102, for initial sampling sub-data of each sampling point, a signal demodulation and a low-pass filtering may be performed on the initial sampling sub-data according to the second direction, to generate filtered sampling sub-data of the each sampling point.

When obtaining the echo signals, for the initial sampling sub-data of each sampling point, the demodulation processing may be performed on the obtained initial sampling sub-data using a demodulator according to the second direction to remove carrier signals and restore base frequency signals. High-frequency harmonic signals may be removed using a low-pass filter, and the filtered sampling sub-data of each sampling point may be obtained.

In operation 1103, for each set of initial sampling data, a summation processing may be performed on the filtered sampling sub-data of the each sampling point in the initial sampling data according to the second direction, to generate updated sampling data corresponding to the initial sampling data.

Refer to FIG. 9, in each set of initial sampling data M, each dotted line may include the filtered sampling sub-data of each sampling point in the multiple initial sampling data. The summation processing may be performed on the filtered sampling sub-data of each sampling point according to the second direction, to generate the updated sampling data corresponding to the initial sampling data. For example, a dotted line may include filtered sampling sub-data of 100 sample points. A data point in the set of initial sampling data M may be obtained by summing the filtered sampling sub-data of 100 sample points. Accordingly, M data points of the set of initial sampling data M may be determined in this way.

In operation 1104, the updated sampling data corresponding to the multiple sets of initial sampling data may be combined to generate an updated sampling data set, and multiple sets of updated sampling data sets may be combined to generate multiple sets of initial Doppler blood flow signal sets.

The updated sampling data sets may include the obtained M data points. Multiple sets of new sampling data sets each of which including M data points may be obtained by combining the multiple sets of updated sampling data sets.

In some embodiments, the multiple sets of initial sampling data of the Doppler blood flow signals in the first direction may be obtained. For the initial sampling sub-data of each sampling point, the signal demodulation and the low-pass filtering processing may be performed on the initial sampling sub-data according to the second direction, to generate the filtered sampling sub-data of each sampling point. For each set of initial sampling data, the summation processing may be performed on the filtered sampling sub-data of each sampling point in the initial sampling data according to the second direction, to generate the updated sampling data corresponding to the initial sampling data. The updated sampling data may be combined to generate the updated sampling data set. The multiple sets of updated sampling data sets may be combined to generate the multiple sets of initial Doppler blood flow signal sets. The process for obtaining the multiple sets of initial Doppler blood flow signal sets described in some embodiments of the present disclosure may be simple and easy to implement, which may improve the efficiency of the generation of the multiple sets of initial Doppler blood flow signal sets.

Figure 12:
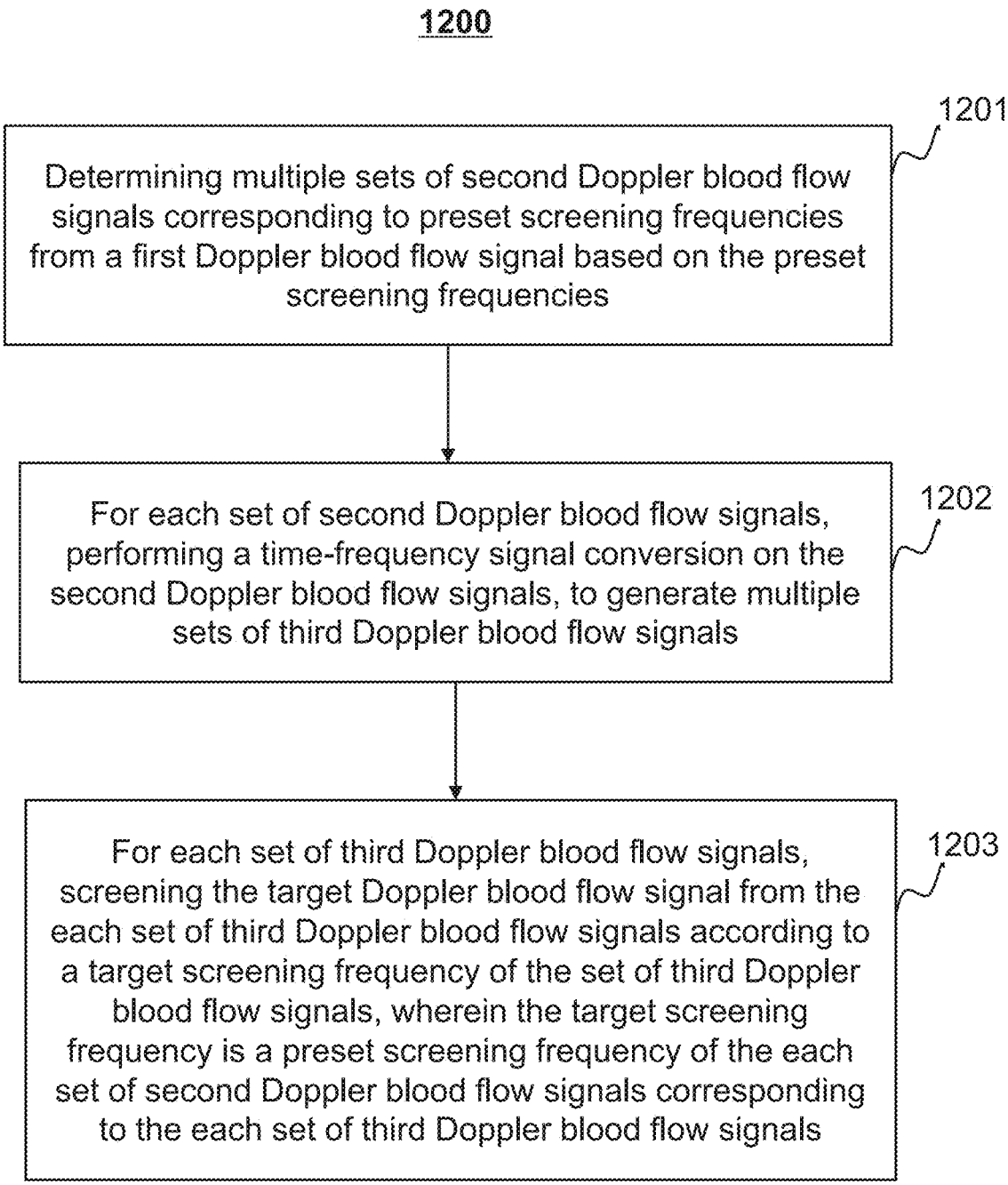
FIG. 12 is a flowchart illustrating an exemplary process for generating a target Doppler blood flow signal according to some embodiments of the present disclosure.

FIG. 12 is a flowchart illustrating an exemplary process for generating a target Doppler blood flow signal according to some embodiments of the present disclosure. FIG. 12 may relate to a possible process for generating the target Doppler blood flow signal. As shown in FIG. 12, the process 1200 may include the following operations.

In operation 1201, multiple sets of second Doppler blood flow signals corresponding to preset screening frequencies may be determined from the first Doppler blood flow signal based on the preset screening frequencies.

When the second Doppler blood flow signals are screened from the first Doppler blood flow signal based on the preset screening frequencies, specifically, since echo signals generated by stationary and slowly moving subjects have lower frequencies, the existence of the signals may affect the accurate extraction of weak blood flow information. Thus, signals having frequencies higher than each preset screening frequency may be screened as the second Doppler blood flow signals according to the each preset screening frequency. If there are 10 preset screening frequencies, 10 sets of second Doppler blood flow signals may be obtained. The frequency of a first set of second Doppler blood flow signals may be higher than a first preset screening frequency, the frequency pf a second set of second Doppler blood flow signals may be higher than a second preset screening frequency, and so on.

In operation 1202, for each set of second Doppler blood flow signals, a time-frequency signal conversion may be performed on the second Doppler blood flow signals, to generate multiple sets of third Doppler blood flow signals.

For each set of second Doppler blood flow signals, the time-frequency signal conversion may be performed on the second Doppler blood flow signals using a preset time-frequency conversion algorithm, to generate the multiple sets of third Doppler blood flow signals. The preset time-frequency conversion algorithm may be a Fourier transform algorithm, a short-time Fourier transform algorithm, etc., which is not specifically limited in this embodiment.

In operation 1203, for each set of third Doppler blood flow signals, the target Doppler blood flow signal may be screened from the each set of third Doppler blood flow signals according to a target screening frequency of the set of third Doppler blood flow signals. The target screening frequency may be a preset screening frequency of the each set of second Doppler blood flow signals corresponding to the each set of third Doppler blood flow signals.

For each set of third Doppler blood flow signals, the target Doppler blood flow signal may be screened from the each set of third Doppler blood flow signals according to the target screening frequency of the each set of third Doppler blood flow signals. After a processing operation is performed on the target Doppler blood flow signal, a Doppler blood flow image may be generated based on the target Doppler blood flow signal. The processing operation may include converting the time frequency signal into the change of blood flow velocity with time, an image processing operation such as an image smoothing operation, a denoising operation, etc.

In some embodiments, the multiple sets of second Doppler blood flow signals corresponding to the preset screening frequencies may be determined from the first Doppler blood flow signal based on each preset screening frequency. For each set of second Doppler blood flow signals, the time-frequency signal conversion may be performed on the second Doppler blood flow signals to generate the multiple sets of third Doppler blood flow signals. For each set of third Doppler blood flow signals, the Doppler blood flow image may be generated according to the target screening frequency of the each set of third Doppler blood flow signals and the each set of third Doppler blood flow signals. The qualified second Doppler blood flow signals may be screened out based on the preset screening frequencies, and the screened second Doppler blood flow signals may represent blood flow information well, which may improve the accuracy of the generated Doppler blood flow image.

FIG. 13 is a flowchart illustrating an exemplary process for determining second Doppler blood flow signals according to some embodiments of the present disclosure. FIG. 13 may relate to a possible process for determining the second Doppler blood flow signals. As shown in FIG. 13, the process 1300 may include the following operations.

In operation 1301, multiple high-pass filters corresponding to preset screening frequencies may be determined based on the preset screening frequencies. Cut-off frequencies of the high-pass filters may be the preset screening frequencies.

The high-pass filters corresponding to the preset screening frequencies may be determined based on each preset screening frequency. Each preset screening frequency may be used as the cut-off frequency of the corresponding high-pass filter. When a frequency of a signal is higher than the cut-off frequency, the signal may pass. When the frequency of the signal is lower than the cut-off frequency, a signal output may be greatly attenuated.

In operation 1302, a filtering processing may be performed on the first Doppler blood flow signal by multiple high-pass filters, respectively, to generate the multiple sets of second Doppler blood flow signals corresponding to the preset screening frequencies.

The filtering processing may be performed on the first Doppler blood flow signal by the multiple high-pass filters, respectively. If there are 10 high-pass filters, 10 sets of second Doppler blood flow signals may be obtained. A first set of second Doppler blood flow signals may be signals after the filtering processing is performed by a first high-pass filter, a second set of second Doppler blood flow signals may be signals after the filtering processing is performed by the second high-pass filter, and so on.

In some embodiments, the multiple high-pass filters corresponding to the preset screening frequencies may be determined based on each preset screening frequency. The filtering processing may be performed, by the multiple high-pass filters, on the first Doppler blood flow signal, respectively, to generate the multiple sets of second Doppler blood flow signals corresponding to the preset screening frequencies. Compared with prior arts, when there is no lost Doppler blood flow signal in the prior art, usually, only one high-pass filter may be used for performing the filtering processing. When the Doppler blood flow signal is lost, if only one high-pass filter is used for performing the filtering processing, only one set of second Doppler blood flow signals may be obtained, and more Doppler blood flow signals may be lost. However, in some embodiments of the present disclosure, the multiple high-pass filters may be used to perform the filtering processing on the first Doppler blood flow signal, respectively, such that the multiple sets of second Doppler blood flow signals may be obtained, which may be the basis for subsequent sub-band imaging.

FIG. 14 is a flowchart illustrating an exemplary process for determining a preset screening frequency range according to some embodiments of the present disclosure. As shown in FIG. 14, the process 1400 may include the following operations.

In operation 1401, for each set of third Doppler blood flow signals, a preset screening frequency range corresponding to the each set of third Doppler blood flow signals may be determined according to a target screening frequency of the each set of third Doppler blood flow signals and pulse repetition frequencies of multiple sets of initial Doppler blood flow signals.

The target screening frequency of the third Doppler blood flow signals may be the preset screening frequency of the second Doppler blood flow signals corresponding to the third Doppler blood flow signals. The preset screening frequency range corresponding to the third Doppler blood flow signals may be determined based on the preset screening frequency and the pulse repetition frequencies of the initial Doppler blood flow signals. The pulse repetition frequencies of the initial Doppler blood flow signals may be referred to as a number of transmitted pulses per unit time.

Optionally, a count of the preset screening frequency ranges corresponding to the third Doppler blood flow signals may be the same as a count of target screening frequencies. The preset screening frequency ranges may have no intersection. A union of the preset screening frequency ranges may be consistent with the frequency range of the initial Doppler blood flow signals. For example, there may be three preset screening frequency ranges, the three preset screening frequency ranges may have no intersection, and a union of the three preset screening frequency ranges may cover the entire frequency range of the initial Doppler flow signals. Moreover, a count of the target screening frequencies included in the preset screening frequency ranges may be one less than an original count of the target screening frequencies. Specifically, the following rule may be used for determining the preset screening frequency ranges.

A first preset screening frequency range may be $[-f_{cut1}, f_{cut1}]$, a second preset screening frequency range may be $[-f_{cut2}, -f_{cut1})$ and $(f_{cut1}, f_{cut2}]$, a third preset screening frequency range may be $[-f_{cut3}, -f_{cut2})$ and $(f_{cut2}, f_{cut3}]$, and so on, the nth preset screening frequency range may be $[-PRF/2, -f_{cut(n-1)})$ and $(f_{cut(n-1)}, PRF/2]$, wherein $f_{cut1}, f_{cut2}, f_{cut3}, f_{cut4}, \ldots, f_{cut(n-1)}$ may represent the preset screening frequencies, i.e., the target screening frequencies, and PRF may represent the pulse repetition frequency. It should be noted that, when determining the preset screening frequency ranges, the preset screening frequency ranges with the same number of target screening frequencies may be determined without using the last frequency among the target screening frequencies. For example, the target screening frequencies may include $f_{cut1}, f_{cut2},$ and $f_{cut3}$, i.e., the count of target screening frequencies may be three, and the three preset screening frequency ranges may be determined as $[-f_{cut1}, f_{cut1}], [-f_{cut2}, -f_{cut1})$ and $(f_{cut1}, f_{cut2}], [-PRF/2, -f_{cut2})$ and $(f_{cut2}, PRF/2]$. That is, the three preset screening frequency ranges may be determined without using $f_{cut3}$. n may be not less than 2, and generally, n may be customized to be greater than 10.

In operation 1402, for each set of third Doppler blood flow signals, the target Doppler blood flow signal may be screened from the each set of third Doppler blood flow signals according to the preset screening frequency range corresponding to the each set of third Doppler blood flow signals.

When screening the signal from the third Doppler blood flow signals according to the preset screening frequency ranges corresponding to the third Doppler blood flow signals, specifically, as shown in FIG. 15. FIG. 15 is a flowchart illustrating another exemplary process for determining a target Doppler blood flow signal according to some embodiments of the present disclosure. As shown in FIG. 15, the process 1500 may include the following operations.

In operation 1501, for each set of third Doppler blood flow signals, multiple sets of fourth Doppler blood flow signals within a preset screening frequency range may be screened from the each set of third Doppler blood flow signals.

In operation 1502, the multiple sets of fourth Doppler blood flow signals may be combined according to frequency sizes of the multiple sets of fourth Doppler blood flow signals, to obtain a target Doppler blood flow signal.

For each set of third Doppler blood flow signals, the multiple sets of fourth Doppler blood flow signals within the preset screening frequency ranges may be screened from the each set of third Doppler blood flow signals. For example, there may be n sets of third Doppler blood flow signals, a first set of fourth Doppler blood flow signals within a frequency range of $[-f_{cut1}, f_{cut1}]$ may be screened from a first set of third Doppler blood flow signal, a second set of fourth Doppler blood flow signals within a frequency ranges of $[-f_{cut2}, -f_{cut1})$ and $(f_{cut1}, f_{cut2}]$ may be screened from a second set of third Doppler blood flow signals, similarly, and an nth set of fourth Doppler blood flow signals within a frequency ranges of $[-PRF/2, -f_{cut(n-1)})$ and $(f_{cut(n-1)}, PRF/2]$ may be screened from an nth group of third Doppler blood flow signals.

Since each set of fourth Doppler blood flow signals have a corresponding frequency size, the multiple sets of fourth Doppler blood flow signals may be combined according to the frequency sizes of the multiple sets of fourth Doppler blood flow signals to generate the target Doppler blood flow signal. A Doppler blood flow image may be generated by processing combined fourth Doppler blood flow signals. The processing operations may include converting the fourth Doppler blood flow signals into the change of blood flow velocity with time, an image processing operation such as an image smoothing operation, a denoising operation, etc.

In some embodiments, for each set of third Doppler flow signals, the preset screening frequency ranges corresponding to the third Doppler flow signals may be determined according to the target screening frequencies of the third Doppler flow signals and the pulse repetition frequencies of the initial Doppler flow signals. For each set of third Doppler blood flow signals, the multiple sets of fourth Doppler blood flow signals within the preset screening frequency range may be screened from the set of third Doppler blood flow signals. The multiple sets of fourth Doppler blood flow signals may be combined according to the frequency sizes of the multiple sets of fourth Doppler blood flow signals, to generate the Doppler blood flow image. A part of signals may be screened out based on the preset screening frequency ranges and screened signals may be determined as the Doppler blood flow signals for imaging, which may greatly reduce frequency points with interference. The Doppler blood flow image may be obtained by sub-frequency range imaging, which may improve the quality of the Doppler blood flow image.

FIG. 16 is a flowchart illustrating an exemplary process for determining a preset screening frequency set according to some embodiments of the present disclosure. As shown in FIG. 16, the process 1600 may include the following operations.

In operation 1601, a frequency range of the multiple sets of initial Doppler blood flow signals may be determined according to pulse repetition frequencies of multiple sets of initial Doppler blood flow signals.

The pulse repetition frequencies of the initial Doppler blood flow signals may be referred to as a number of pulses transmitted per unit time. The pulse repetition frequencies may be used as the maximum blood flow frequency. The minimum blood flow frequency may be set as 0. The frequency range of the initial Doppler blood flow signals may be obtained based on the minimum blood flow frequency and the maximum blood flow frequency.

In operation 1602, at least two preset screening frequencies may be determined from the frequency range of the multiple sets of initial Doppler blood flow signals.

At least two frequency values may be selected from the blood flow frequency ranges as the preset screening frequencies according to a preset rule. Optionally, the at least two preset screening frequencies may be obtained by dividing the pulse repetition frequencies in the blood flow frequency ranges equally. For example, the frequency range of the initial Doppler blood flow signals may be 0-120 Hz. If two preset screening frequencies need to be obtained, the range of 0-120 Hz may need to be equally divided into three sections. The obtained two preset screening frequencies may be 40 Hz and 80 Hz. The at least two frequency values may be arbitrarily selected as the preset screening frequencies. The at least two frequency values may be selected as the preset screening frequencies by other selection methods, which is not specifically limited in this embodiment.

In operation 1603, a preset screening frequency set may be generated based on the at least two preset screening frequencies.

When the preset screening frequency set is generated based on the at least two preset screening frequencies, for example, if the first preset screening frequency is $f_{cut1}$, and the second preset screening frequency is $f_{cut2}$, the preset screening frequency set may be determined as $\{f_{cut1}, f_{cut2}\}$.

In some embodiments, the frequency range of the initial Doppler blood flow signals may be determined according to the pulse repetition frequencies of the initial Doppler blood flow signal. The at least two preset screening frequencies may be determined from the frequency range of the initial Doppler blood flow signals. The preset screening frequency set may be generated based on the at least two preset screening frequencies. Since the frequency range of the initial Doppler blood flow signals is determined based on the pulse repetition frequencies of the initial Doppler blood flow signals, the frequency ranges may cover the entire blood flow frequency range. The at least two preset screening frequencies may be selected from the frequency range of the multiple sets of initial Doppler blood flow signals to generate the preset screening frequency set, which may be reasonable and conform to actual application scenarios.

Figure 17:
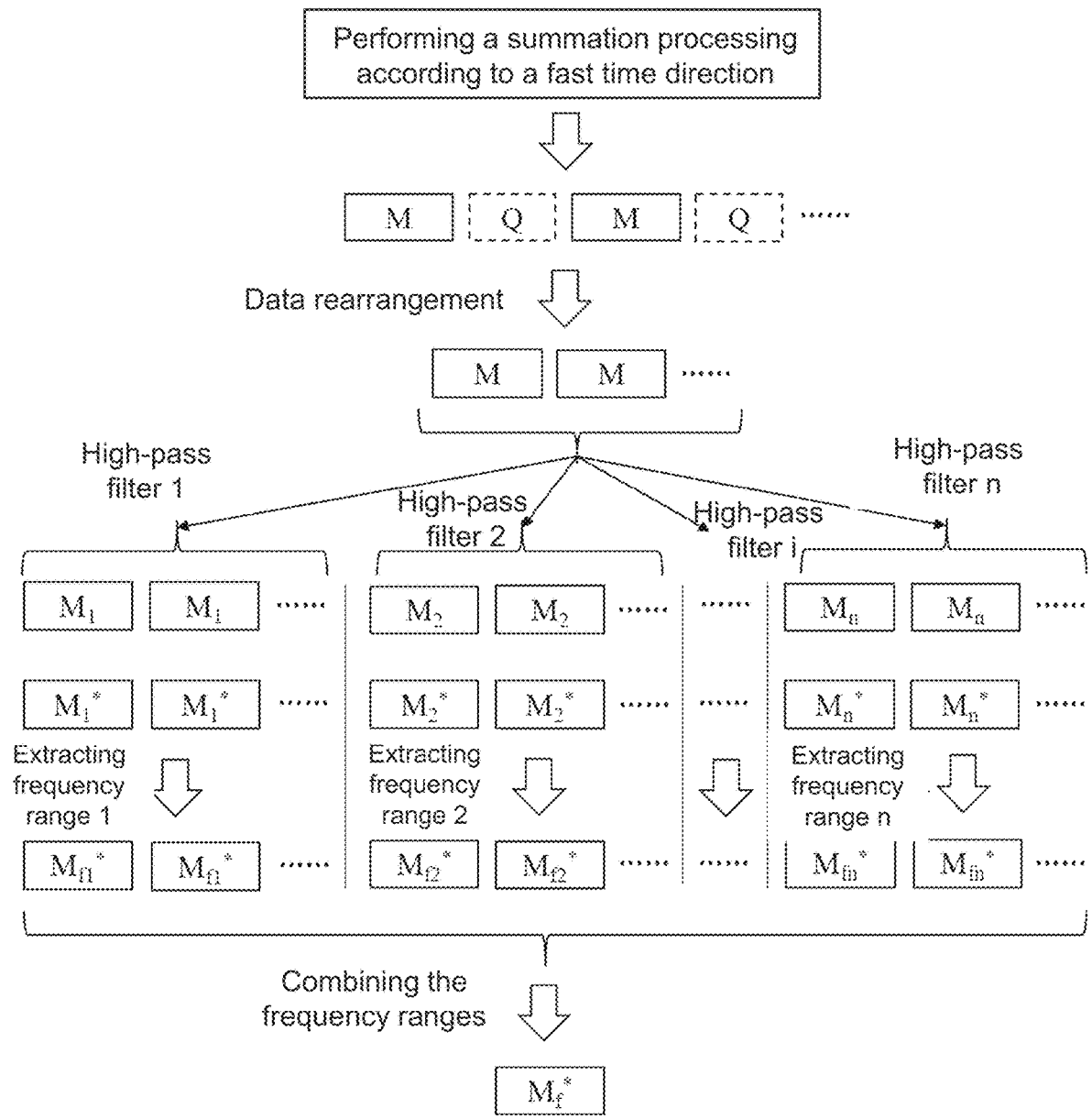
FIG. 17 is an overall framework diagram illustrating an exemplary signal processing process according to some embodiments of the present disclosure.
Figure 18:
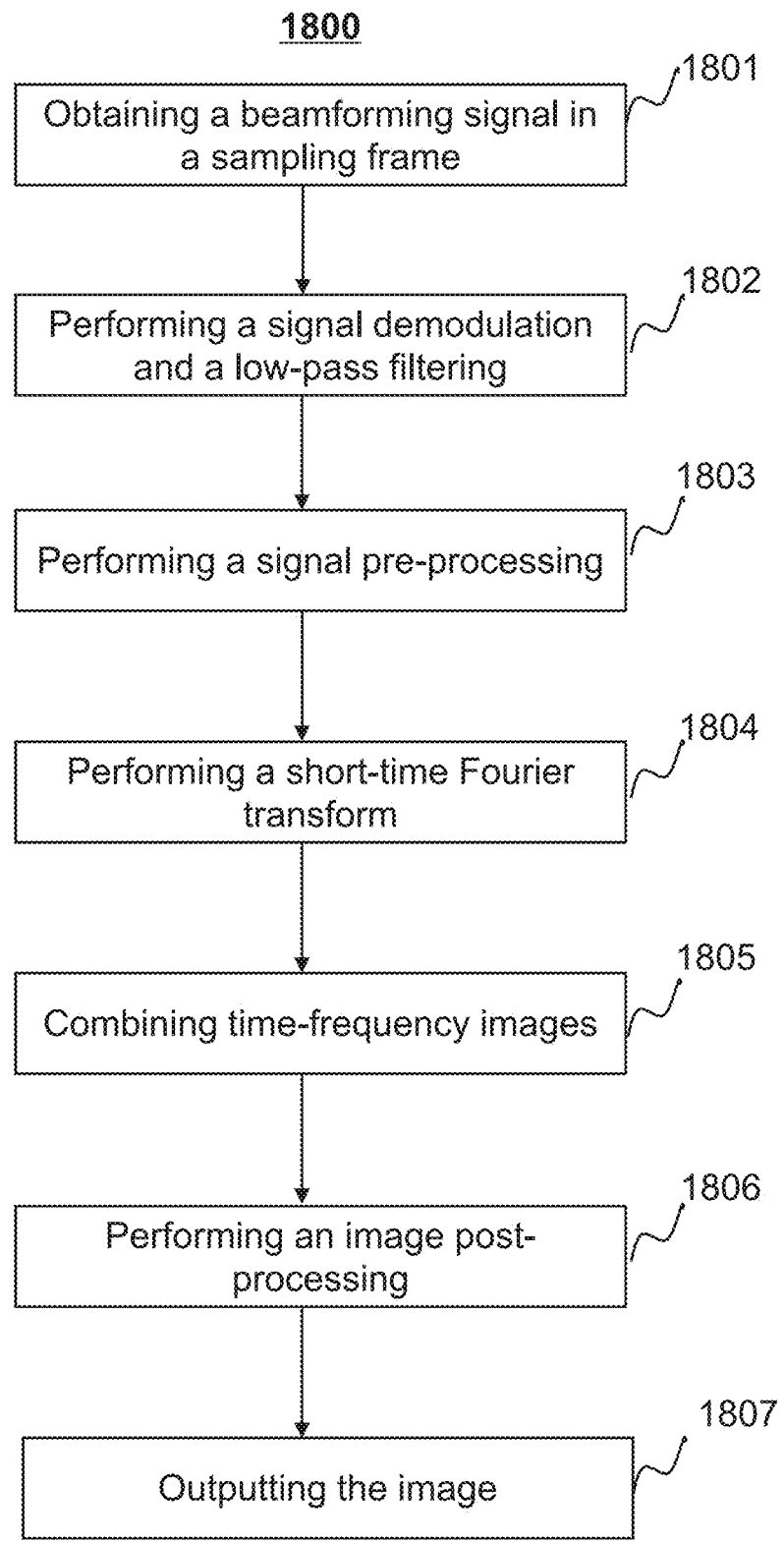
FIG. 18 is a schematic flowchart illustrating an exemplary signal processing process according to some embodiments of the present disclosure.

In some embodiments, as shown in FIG. 17, FIG. 17 is an overall framework diagram illustrating an exemplary signal processing process according to some embodiments of the present disclosure. On the basis of the framework diagram, as shown in FIG. 18, FIG. 18 is a schematic flowchart illustrating an exemplary signal processing process according to some embodiments of the present disclosure. As shown in FIG. 18, the process 1800 may include the following operations.

In operation 1801, a beamforming signal may be obtained in a sampling frame.

Specifically, Doppler blood flow signals in a sampling frame in a PW mode may be obtained using a beamforming method. That is, the obtained Doppler blood flow signals in the sampling frame may include multiple sets of initial Doppler blood flow signals of sampling points in the sampling frame in a slow time direction, i.e., the beamforming signal.

In operation 1802, a signal demodulation and a low-pass filtering may be performed.

The signal demodulation and the low-pass filtering may be performed on the beamforming signal according to a fast time direction. A summation operation may be performed on each set of fast time signals to generate the multiple sets of initial Doppler blood flow signal sets. The multiple sets of initial Doppler blood flow signals may be ranked according to the generation times of the multiple sets of initial Doppler blood flow signals, to generate a first Doppler blood flow signal.

In operation 1803, a signal pre-processing may be performed.

The n sets of filtered data may be obtained by processing the first Doppler blood flow signal using n sets of high-pass filters, respectively. Specifically, the multiple high-pass filters corresponding to the preset screening frequencies may be determined based on each preset screening frequency. The cut-off frequencies of the high-pass filters may be the preset screening frequencies. Specifically, the cut-off frequencies may be set as $f_{cut1}, f_{cut2}, \ldots$, respectively. The relationship between the cut-off frequencies may be $f_{cut1} < f_{cut2} < \ldots < f_{cutn}$. The filtering processing may be performed on the first Doppler blood flow signal by the multiple high-pass filters, respectively, to generate multiple sets of second Doppler blood flow signals ($M_1, M_2, \ldots, M_n$) corresponding to the preset screening frequencies.

In operation 1804, a short-time Fourier transform may be performed.

For each set of second Doppler blood flow signals, a time-frequency signal conversion may be performed on the set of second Doppler blood flow signals to generate multiple sets of third Doppler blood flow signals ($M_1^*, M_2^*, \ldots, M_n^*$). For each set of third Doppler blood flow signals, a Doppler blood flow image may be generated according to a target screening frequency of the set of third Doppler blood flow signals and the set of third Doppler blood flow signals. The target screening frequency may be the preset screening frequency of the set of second Doppler blood flow signals corresponding to the set of third Doppler blood flow signals.

In operation 1805, time-frequency images may be combined.

For each set of third Doppler blood flow signals, the preset screening frequency range corresponding to the set of third Doppler blood flow signals may be determined according to the target screening frequency of the set of third Doppler blood flow signals and the pulse repetition frequencies of the multiple sets of initial Doppler blood flow signals. For each set of third Doppler blood flow signals, multiple sets of fourth Doppler blood flow signals within the preset screening frequency range may be screened from the each set of third Doppler blood flow signals. Specifically, signals within the frequency range of $[-f_{cut1}, f_{cut1}]$ may be extracted from $M_1^*$ signals to obtain $M_{f1}^*$, signals within the frequency ranges of $[-f_{cut2}, -f_{cut1}]$ and $(f_{cut1}, f_{cut2}]$ may be extracted from $M_2^*$ signals to obtain $M_{f2}^*$, signals within the frequency ranges of $[-f_{cut3}, -f_{cut2})$ and $(f_{cut2}, f_{cut3}]$ may be extracted from $M_3^*$ signals to obtain $M_{f3}^*$, and so on, and signals within the frequency ranges of $[-PRF/2, -f_{cut(n-1)})$ and $(f_{cut(n-1)}, PRF/2]$ may be extracted from $Mn^*$ signals to obtain $M_{fn}^*$. The multiple sets of fourth Doppler blood flow signals may be combined according to the frequency sizes of the multiple sets of fourth Doppler blood flow signals, to obtain $M_f^*$, and the Doppler blood flow image may be generated.

In operation 1806, an image post-processing may be performed.

Operations such as an image compression, an image smoothing, an image enveloping, etc., may be performed on the Doppler blood flow image.

In operation 1807, the image may be outputted.

The Doppler flow image may be displayed on a screen.

In some embodiments, compared with prior arts, in the case of massive data loss, the accuracy of the Doppler blood flow signal obtained by data filling may be relatively low, and the quality of the blood flow image may be relatively low. However, the obtained multiple sets of Doppler blood flow signals may be directly processed to generate the final Doppler blood flow image. Firstly, although the data volume of the first Doppler blood flow signal without filling is reduced, the signal can be used to characterize main features in the Doppler blood flow image. Secondly, since there are interferences in amplitudes corresponding to multiple frequency points in a spectrogram corresponding to the first Doppler blood flow signal, by dividing the first Doppler blood flow signal into multiple frequency ranges according to a preset screening frequency range, and screening a part of signal from each frequency range as the target Doppler blood flow signal, the frequency points with interference may be greatly reduced. The Doppler blood flow image may be obtained by sub-frequency range imaging, which may improve the quality of the Doppler blood flow image.

Figure 20A:
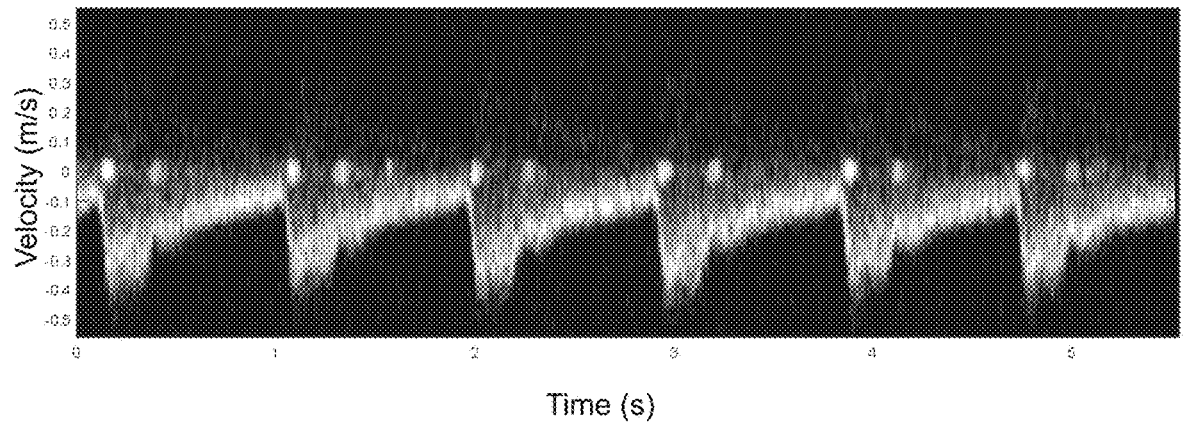
FIGS. 20a-20c are schematic diagrams illustrating exemplary Doppler blood flow images according to some embodiments of the present disclosure.
Figure 20B:
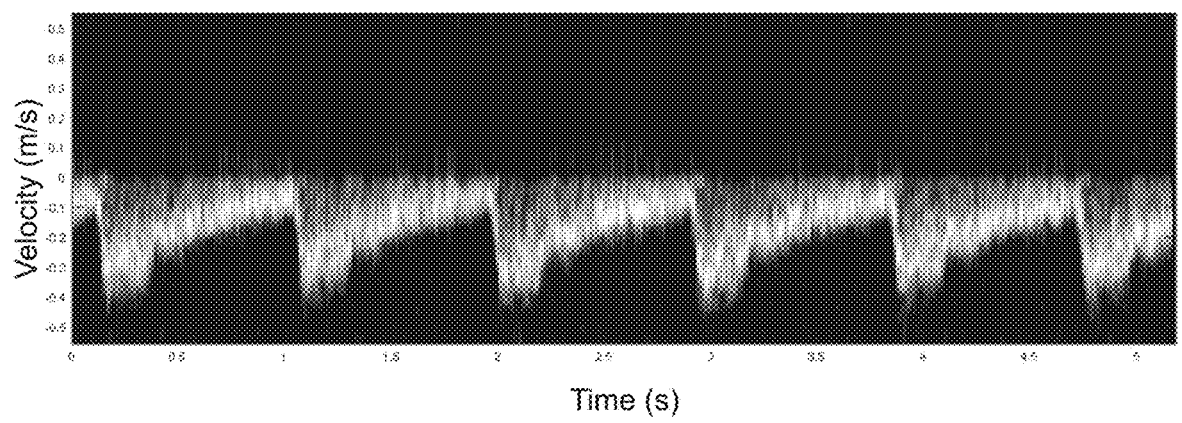

In some embodiments, the Doppler blood flow image obtained using the signal processing method provided in the present disclosure may be displayed. FIG. 20a is a Doppler blood flow image obtained by using a traditional processing method under a condition that a Doppler blood flow signal is not lost. FIG. 20b is a Doppler blood flow image obtained by using a signal processing method provided in some embodiments of the present disclosure under a condition that a Doppler blood flow signal is lost, and a ratio (Q:M) of lost data to known data is 32:64. FIG. 16 is a Doppler blood flow image obtained by using a signal processing method provided in some embodiments of the present disclosure under a condition that a Doppler blood flow signal is lost, and a ratio (Q:M) of lost data to known data is 64:64.

Figure 20C:
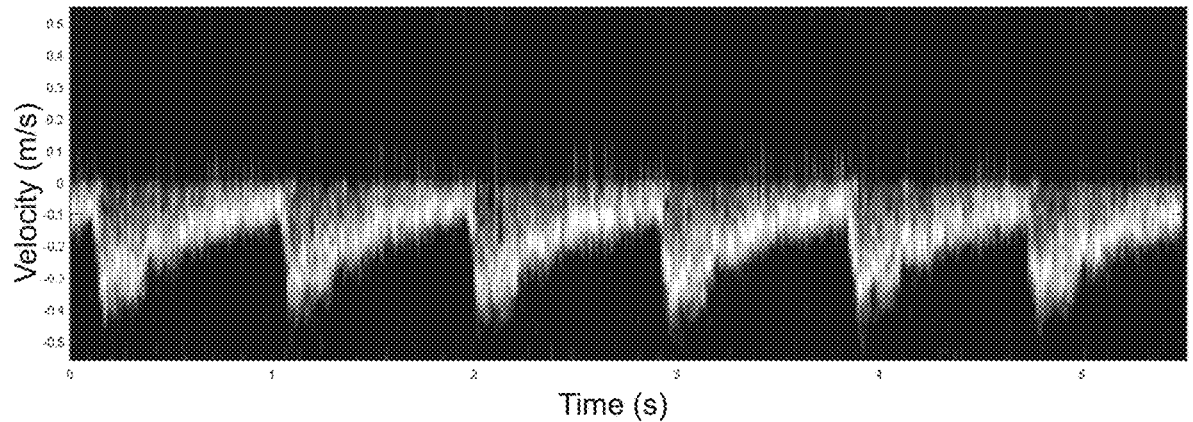

It can be seen that the Doppler blood flow images shown in FIG. 20a and FIG. 20b are both accurately reflect main features of the Doppler blood flow image shown in FIG. 20a, and no interference signal (noise) is introduced. The main features may be determined based on a time, an amplitude, a period, and other parameter. Meanwhile, when Q:M increases, the Doppler blood flow images shown in FIG. 20b and FIG. 20c are almost the same, which may indicate that the signal processing method provided in some embodiments of the present disclosure is less affected by the ratio (Q:M) of lost data to known data. The signal processing method provided in some embodiments of the present disclosure may also applicable when the ratio (Q:M) of lost data to known data is greater than 1:1. Usually, when the ratio (Q:M) of lost data to known data is less than or equal to 1:1, the effect of the signal processing method may be relatively good.

In some embodiments, an ultrasonic device may be provided. The ultrasonic device may include a signal acquisition device and a signal processing device. The signal acquisition device may be in communication with the signal processing device.

The signal acquisition device may be configured to obtain multiple sets of initial Doppler blood flow signals, and send the multiple sets of initial Doppler blood flow signals to the signal processing device. There may be a signal gap between the multiple sets of initial Doppler blood flow signals.

The signal processing device may be configured to: rank the multiple sets of initial Doppler blood flow signals according to generation times of the multiple sets of initial Doppler blood flow signals to generate a first Doppler blood flow signal, wherein the time of the first Doppler blood flow signal may be continuous; determine a preset screening frequency set according to pulse repetition frequencies of the initial Doppler blood flow signal, wherein the preset screening frequency set may include at least two preset screening frequencies; screen a target Doppler blood flow signal from the first Doppler blood flow signal based on the each preset screening frequency in the preset screening frequency set; and generate a Doppler blood flow image based on the target Doppler blood flow signal.

In some embodiments, the signal processing device may be configured to: determine multiple sets of second Doppler blood flow signals corresponding to the preset screening frequencies from the first Doppler blood flow signal based on the each preset screening frequency; for each set of second Doppler blood flow signals, perform a time-frequency signal conversion on the second Doppler blood flow signals, to generate multiple sets of third Doppler blood flow signals; for each set of third Doppler blood flow signals, screen the target Doppler blood flow signal from the each set of third Doppler blood flow signals according to a target screening frequency of the each set of third Doppler blood flow signals, wherein the target screening frequency may be the preset screening frequency of the each set of second Doppler blood flow signals corresponding to the each set of third Doppler blood flow signals.

In some embodiments, the signal processing device may further be configured to: determine multiple high-pass filters corresponding to the preset screening frequencies based on each preset screening frequency, wherein cut-off frequencies of the high-pass filters may be the preset screening frequencies; and perform, by multiple high-pass filters, a filtering processing on the first Doppler blood flow signals, respectively, to generate the multiple sets of second Doppler blood flow signals corresponding to the preset screening frequencies.

In some embodiments, the signal processing device may further be configured to: for each set of third Doppler blood flow signals, determine a preset screening frequency range corresponding to the each set of third Doppler blood flow signals according to the target screening frequency of the each set of third Doppler blood flow signals and the pulse repetition frequencies of the multiple sets of initial Doppler blood flow signals; and for each set of third Doppler blood flow signals, screen the target Doppler blood flow signal from the each set of third Doppler blood flow signals according to the preset screening frequency range corresponding to the each set of third Doppler blood flow signals.

In some embodiments, the signal processing device may further be configured to: for each set of third Doppler blood flow signals, screen multiple sets of fourth Doppler blood flow signals within the preset screening frequency range from the each set of third Doppler blood flow signals; and combine the multiple sets of fourth Doppler blood flow signals according to frequency sizes of the multiple sets of fourth Doppler blood flow signals, to obtain the target Doppler blood flow signal.

In some embodiments, the signal processing device may further be configured to: determine frequency range of the initial Doppler blood flow signals according to the pulse repetition frequencies of the initial Doppler blood flow signal; determine at least two preset screening frequencies from the frequency range of the initial Doppler blood flow signals; and generate a preset screening frequency set based on the at least two preset screening frequencies.

In some embodiments, a count of the preset screening frequency ranges may be the same as a count of the target screening frequencies. The preset screening frequency ranges may have no intersection. A union of the preset screening frequency ranges may be consistent with the frequency ranges of the initial Doppler blood flow signals.

In some embodiments, the signal processing device may further be configured to: obtain multiple sets of initial sampling data of Doppler blood flow signals in a first direction, wherein each set of initial sampling data may include initial sampling sub-data of multiple sampling points in a second direction, the first direction may be a sampling time direction of the initial sampling data, and the second direction may be a depth direction of a subject to be detected; for the initial sampling sub-data of each sampling point, perform a signal demodulation and a low-pass filtering processing on the initial sampling sub-data according to the second direction, to generate filtered sampling sub-data of each sampling point; for each set of initial sampling data, perform a summation processing on the filtered sampling sub-data of each sampling point in the initial sampling data according to the second direction, to generate new sampling data corresponding to the initial sampling data; combine the new sampling data to generate a new sampling data set; and combine multiple sets of new sampling data sets to generate multiple sets of initial Doppler blood flow signal sets.

It should be understood that although the operations in the flowcharts related to the above embodiments are shown sequentially according to the arrows, these operations may not be necessarily executed sequentially in the order indicated by the arrows. Unless otherwise specified herein, there is no strict order restriction on the execution of these operations, and these operations can be executed in other orders. Moreover, at least some of the operations in the flowcharts related to the embodiments may include multiple operations or stages, and these operations or stages may not be necessarily executed at the same time, but may be performed at different times. The execution order of these operations or stages may not be necessarily performed sequentially, but may be executed in turn or alternately with other operations or at least a part of operations or stages in other operations.

Based on the same invention concept, the embodiments of the present disclosure may further provide a signal processing device for implementing the signal processing method. The solution to the problem provided by the device may be similar to the implementation described in the signal processing method, so the specific limitations of one or more embodiments of the signal processing device provided below may be referred to as the above-mentioned definition of the signal processing method, which is not repeated here.

Figure 19:
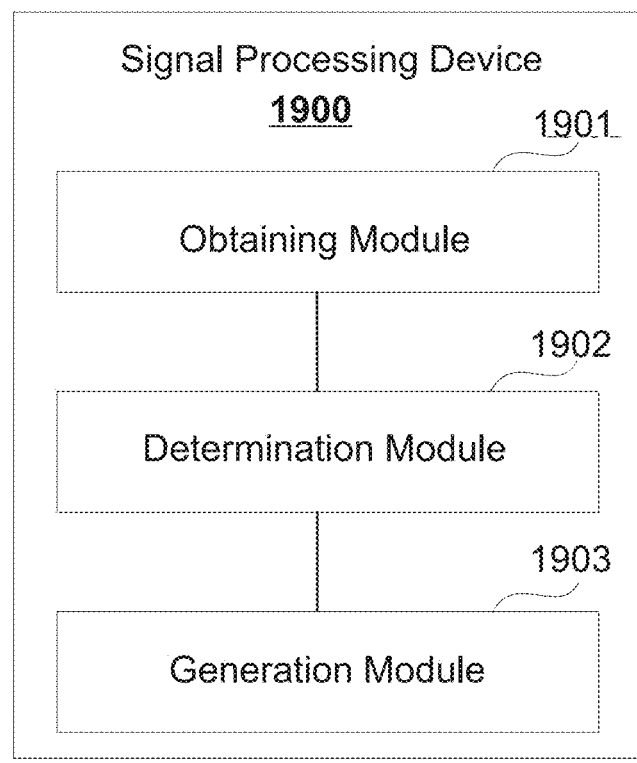
FIG. 19 is a structural block diagram illustrating an exemplary signal processing device according to some embodiments of the present disclosure.

In some embodiments, as shown in FIG. 19, a signal processing device 1900 may be provided. The signal processing device 1900 may include an obtaining module 1901, a determination module 1902, and a generation module 1903.

The obtaining module 1901 may be configured to obtain multiple sets of initial Doppler blood flow signals, rank the multiple sets of initial Doppler blood flow signals according to generation times of the multiple sets of initial Doppler blood flow signals, to generate a first Doppler blood flow signal flow signal, such that a time of the first Doppler blood flow signal is continuous.

The determination module 1902 may be configured to determine a preset screening frequency set according to pulse repetition frequencies of the initial Doppler blood flow signals. The preset screening frequency set may include at least two preset filtering frequencies.

The generation module 1903 may be configured to screen a target Doppler blood flow signal from the first Doppler blood flow signal based on each preset screening frequency in the preset screening frequency set, and generate a Doppler blood flow signal based on the target Doppler blood flow signal.

In some embodiments, the generation module 1903 may be configured to: determine multiple sets of second Doppler blood flow signals corresponding to the preset screening frequencies from the first Doppler blood flow signal based on the each preset screening frequency; for each set of second Doppler blood flow signals, perform a time-frequency signal conversion on the second Doppler blood flow signals to generate multiple sets of third Doppler blood flow signals; and for each set of third Doppler blood flow signals, screen the target Doppler blood flow signal from the each set of third Doppler blood flow signals according to a target screening frequency of the each set of third Doppler blood flow signals. The target screening frequency may be the preset screening frequency of the each set of second Doppler blood flow signals corresponding to the each set of third Doppler blood flow signals.

In some embodiments, the generation module 1903 may further be configured to: determine multiple high-pass filters corresponding to the preset screening frequencies based on each preset screening frequency, wherein cut-off frequencies of the high-pass filter may be the preset screening frequencies; and perform, by multiple high-pass filters, a filtering processing on the first Doppler blood flow signal, respectively, to generate multiple sets of second Doppler blood flow signals corresponding to the preset screening frequencies.

In some embodiments, the generation module 1903 may further be configured to: for each set of third Doppler blood flow signals, determine the preset screening frequency range corresponding to the each set third Doppler blood flow signals according to the target screening frequency of the each set of third Doppler blood flow signals and the pulse repetition frequencies of the multiple sets of initial Doppler blood flow signals; and for each set of third Doppler blood flow signals, screen the target Doppler blood flow signal from the each set of third Doppler blood flow signals according to the preset screening frequency range corresponding to the each set of third Doppler blood flow signals.

In some embodiments, the generation module 1903 may further be configured to: for each set of third Doppler blood flow signals, screen multiple sets of fourth Doppler blood flow signals within the preset screening frequency range from the each set of third Doppler blood flow signals; and combine the multiple sets of fourth Doppler blood flow signals according to the frequency sizes of the multiple sets of fourth Doppler blood flow signals, to obtain the target Doppler blood flow signal.

In some embodiments, the determination module 1902 may be configured to: determine the frequency range of the initial Doppler blood flow signals according to the pulse repetition frequencies of the initial Doppler blood flow signals; determine at least two preset screening frequencies from the frequency ranges of the initial Doppler blood flow signals; and generate the preset screening frequency set based on the at least two preset screening frequencies.

In some embodiments, a count of the preset screening frequency ranges may be the same as a count of the target screening frequencies. The preset screening frequency ranges may have no intersection. A union of the preset screening frequency ranges may be consistent with the frequency range of the initial Doppler blood flow signals.

In some embodiments, the obtaining module 1901 may be configured to: obtain multiple sets of initial sampling data of Doppler blood flow signals in a first direction, wherein each set of initial sampling data may include initial sampling sub-data of multiple sampling points in a second direction, the first direction may be a sampling time direction of the initial sampling data, and the second direction may be a depth direction of a subject to be detected; for the initial sampling sub-data of each sampling point, perform a signal demodulation and a low-pass filtering processing on the initial sampling sub-data according to the second direction, to generate filtered sampling sub-data of each sampling point; for each set of initial sampling data, perform a summation processing on the filtered sampling sub-data of each sampling point in the initial sampling data according to the second direction, to generate new sampling data corresponding to the initial sampling data; and combine the new sampling data to generate a new sampling data set, and combine multiple sets of new sampling data sets to generate multiple sets of initial Doppler blood flow signal sets.

Each module in the signal processing device may be fully or partially implemented by software, hardware, or a combination thereof. The modules may be embedded in or independent of the processor in the computer device in the form of hardware, and may also be stored in the memory of the computer device in the form of software, so that the processor can invoke and execute the corresponding operations of the modules.

In some embodiments, a computer device may be provided. The computer device may include a memory and a processor. Computer programs may be stored in the memory. The processor may implement the following operations when executing the computer programs.

The operations may include: obtaining multiple sets of initial Doppler blood flow signals; ranking the multiple sets of initial Doppler blood flow signals according to generation times of the multiple sets of initial Doppler blood flow signals, to generate a first Doppler blood flow signal, such that a time of the first Doppler blood flow signal is continuous; determining a preset screening frequency set according to pulse repetition frequencies of the initial Doppler blood flow signals, wherein the preset screening frequency set may include at least two preset screening frequencies; screening a target Doppler blood flow signal from the first Doppler blood flow signal based on each preset screening frequency in the preset screening frequency set; and generating a Doppler blood flow image based on the target Doppler blood flow signals.

In some embodiments, the processor may also implement the following operations when executing the computer programs.

The operations may include: determining multiple sets of second Doppler blood flow signals corresponding to the preset screening frequencies from the first Doppler blood flow signal based on the each preset screening frequency; for each set of second Doppler blood flow signals, performing a time-frequency signal conversion on the second Doppler blood flow signals, to generate multiple sets of third Doppler blood flow signals; and for each set of third Doppler blood flow signals, screening a target Doppler blood flow signal from the each set of third Doppler blood flow signals according to a target screening frequency of the each set of third Doppler blood flow signals. The target screening frequency may be a preset screening frequency of the each set of second Doppler blood flow signals corresponding to the each set of third Doppler blood flow signals.

In some embodiments, the processor may also implement the following operations when executing the computer programs.

The operations may include: determining multiple high-pass filters corresponding to the preset screening frequencies based on each preset screening frequency, wherein the cut-off frequencies of the high-pass filters may be the preset screening frequencies; and performing, by multiple high-pass filters, a filtering processing on the first Doppler blood flow signal, respectively, to generate multiple sets of second Doppler blood flow signals corresponding to the preset screening frequencies.

In some embodiments, the processor may also implement the following operations when executing the computer programs.

The operations may include: for each set of third Doppler blood flow signals, determining a preset screening frequency range corresponding to the each set of third Doppler blood flow signals according to the target screening frequency of the each set of third Doppler blood flow signals and the pulse repetition frequencies of the multiple sets of initial Doppler blood flow signals; and for each set of third Doppler blood flow signals, screening the target Doppler blood flow signal from the each set of third Doppler blood flow signals according to the preset screening frequency range corresponding to the each set of third Doppler blood flow signals.

In some embodiments, the processor may also implement the following operations when executing the computer programs.

The operations may include: for each set of third Doppler blood flow signals, screening multiple sets of fourth Doppler blood flow signals within the preset screening frequency range from the each set of third Doppler blood flow signals; and combining the multiple sets of fourth Doppler blood flow signals according to frequency sizes of the multiple sets of fourth Doppler blood flow signals, to obtain the target Doppler blood flow signal.

In some embodiments, the processor may also implement the following operations when executing the computer programs.

The operations may include: determining a frequency range of the initial Doppler blood flow signals according to pulse repetition frequencies of the initial Doppler blood flow signals; determining at least two preset screening frequencies from the frequency range of the initial Doppler blood flow signals; and generating a preset screening frequency set based on the at least two preset screening frequencies.

In some embodiments, a count of the preset screening frequency ranges may be the same as a count of the target screening frequencies. The preset screening frequency ranges may have no intersection. A union of the preset screening frequency ranges may be consistent with a frequency range of the initial Doppler blood flow signals.

In some embodiments, the processor may also implement the following operations when executing the computer programs.

The operations may include: obtaining multiple sets of initial sampling data of Doppler blood flow signals in a first direction, wherein each set of initial sampling data may include initial sampling sub-data of multiple sampling points in a second direction, the first direction may be a sampling time direction of the initial sampling data, and the second direction may be a depth direction of a subject to be detected; for the initial sampling sub-data of each sampling point, performing a signal demodulation and a low-pass filtering processing on the initial sampling sub-data according to the second direction, to generate filtered sampling sub-data of each sampling point; for each set of initial sampling data, performing a summation processing on the filtered sampling sub-data of each sampling point in the initial sampling data according to the second direction, to generate new sampling data corresponding to the initial sampling data; combining the new sampling data to generate a new sampling data set; and combining multiple sets of new sampling data sets to generate the multiple sets of initial Doppler blood flow signal sets.

The implementation principles and technical effects of the computer device provided by the embodiments of the present disclosure may be similar to those of the method embodiments, and may not be repeated here.

In some embodiments, a non-transitory computer-readable storage medium storing a computer program may be provided. When the computer program is executed by a processor, the following operations may be implemented.

The operations may include: obtaining multiple sets of initial Doppler blood flow signals; ranking the multiple sets of initial Doppler blood flow signals according to generation times of the multiple sets of initial Doppler blood flow signals, to generate a first Doppler blood flow signal, such that a time of the first Doppler blood flow signal is continuous; determining a preset screening frequency set according to pulse repetition frequencies of the initial Doppler blood flow signals, wherein the preset screening frequency set may include at least two preset screening frequencies; screening a target Doppler blood flow signal from the first Doppler blood flow signal based on each preset screening frequency in the preset screening frequency set; and generating a Doppler blood flow image based on the target Doppler blood flow signal.

In some embodiments, when the computer program is executed by the processor, the following operations may be implemented.

The operations may include: determining multiple sets of second Doppler blood flow signals corresponding to the preset screening frequencies from the first Doppler blood flow signal based on the each preset screening frequency; for each set of second Doppler blood flow signals, performing a time-frequency signal conversion on the second Doppler blood flow signals, to generate multiple sets of third Doppler blood flow signals; and for each set of third Doppler blood flow signals, screening the target Doppler blood flow signal from the each set of third Doppler blood flow signals according to a target screening frequency of the each set of third Doppler blood flow signals. The target screening frequency may be the preset screening frequency of the each set of second Doppler blood flow signals corresponding to the each set of third Doppler blood flow signals.

In some embodiments, when the computer program is executed by the processor, the following operations may be implemented.

The operations may include: determining multiple high-pass filters corresponding to the preset screening frequencies based on each preset screening frequency, wherein cut-off frequencies of the high-pass filters may be the preset screening frequencies; and performing, by multiple high-pass filters, a filtering processing on the first Doppler blood flow signal, respectively, to generate the multiple sets of second Doppler blood flow signals corresponding to the preset screening frequencies.

In some embodiments, when the computer program is executed by the processor, the following operations may be implemented.

The operations may include: for each set of third Doppler blood flow signals, determining a preset screening frequency range corresponding to the each set of third Doppler blood flow signal according to the target screening frequency of the each set of third Doppler blood flow signals and the pulse repetition frequencies of the initial Doppler blood flow signals; and for each set of third Doppler blood flow signals, screening the target Doppler blood flow signal from the each set of third Doppler blood flow signals according to the preset screening frequency range corresponding to the each set of third Doppler blood flow signals.

In some embodiments, when the computer program is executed by the processor, the following operations may be implemented.

The operations may include: for each set of third Doppler blood flow signals, screening multiple sets of fourth Doppler blood flow signals within the preset screening frequency range from the each set of third Doppler blood flow signals; and combining the multiple sets of fourth Doppler blood flow signals according to frequency sizes of the multiple sets of fourth Doppler blood flow signals, to obtain the target Doppler blood flow signal.

In some embodiments, when the computer program is executed by the processor, the following operations may be implemented.

The operations may include: determining a frequency range of the initial Doppler blood flow signals according to the pulse repetition frequencies of the initial Doppler blood flow signals; determining at least two preset screening frequencies from the frequency range of the initial Doppler blood flow signals; and generating the preset screening frequency set based on the at least two preset screening frequencies.

In some embodiments, a count of the preset screening frequency ranges may be the same as a count of the target screening frequencies. The preset screening frequency ranges may have no intersection. A union of the preset screening frequency ranges may be consistent with a frequency range of the initial Doppler blood flow signals.

In some embodiments, when the computer program is executed by the processor, the following operations may be implemented.

The operations may include: obtaining multiple sets of initial sampling data of Doppler blood flow signals in a first direction, wherein each set of initial sampling data may include initial sampling sub-data of multiple sampling points in a second direction, the first direction may be a sampling time direction of the initial sampling data, and the second direction may be a depth direction of a subject to be detected; for the initial sampling sub-data of each sampling point, performing a signal demodulation and a low-pass filtering processing on the initial sampling sub-data according to the second direction, to generate filtered sampling sub-data of each sampling point; for each set of initial sampling data, performing a summation processing on the filtered sampling sub-data of each sampling point in the initial sampling data according to the second direction, to generate new sampling data corresponding to the initial sampling data; combining the new sampling data to generate a new sampling data set; and combining multiple sets of new sampling data sets to generate multiple sets of initial Doppler blood flow signal sets.

The implementation principle and technical effect of the computer-readable storage medium provided in some embodiments may be similar to those of the method embodiments, and details are not repeated here.

In some embodiments, a computer program product may be provided. The computer program product may include a computer program. When the computer program is executed by a processor, the following operations may be implemented.

The operations may include: obtaining multiple sets of initial Doppler blood flow signals; ranking the multiple sets of initial Doppler blood flow signals according to generation times of the multiple sets of initial Doppler blood flow signals, to generate a first Doppler blood flow signal, such that a time of the first Doppler blood flow signal is continuous; determining a preset screening frequency set according to pulse repetition frequencies of the initial Doppler blood flow signals, wherein the preset screening frequency set may include at least two preset screening frequencies; screening a target Doppler blood flow signal from the first Doppler blood flow signal based on each preset screening frequency in the preset screening frequency set; and generating a Doppler blood flow image based on the target Doppler blood flow signal.

In some embodiments, when the computer program is executed by the processor, the following operations may be implemented.

The operations may include: determining multiple sets of second Doppler blood flow signals corresponding to the preset screening frequencies from the first Doppler blood flow signal based on the each preset screening frequency; for each set of second Doppler blood flow signals, performing a time-frequency signal conversion on the second Doppler blood flow signals, to generate multiple sets of third Doppler blood flow signals; and for each set of third Doppler blood flow signals, screening the target Doppler blood flow signal from the each set of third Doppler blood flow signals according to a target screening frequency of the each set of third Doppler blood flow signals. The target screening frequency may be the preset screening frequency of the each set of second Doppler blood flow signal corresponding to the each set of third Doppler blood flow signals.

In some embodiments, when the computer program is executed by the processor, the following operations may be implemented.

The operations may include: determining multiple high-pass filters corresponding to the preset screening frequencies based on each preset screening frequency, wherein cut-off frequencies of the high-pass filters may be the preset screening frequencies; and performing, by multiple high-pass filters, a filtering processing on the first Doppler blood flow signal, respectively, to generate the multiple sets of second Doppler blood flow signals corresponding to the preset screening frequencies.

In some embodiments, when the computer program is executed by the processor, the following operations may be implemented.

The operations may include: for each set of third Doppler blood flow signals, determining a preset screening frequency range corresponding to the each set of third Doppler blood flow signals according to the target screening frequency of the each set of third Doppler blood flow signals and the pulse repetition frequencies of the multiple sets of initial Doppler blood flow signals; and for each set of third Doppler blood flow signals, screening the target Doppler blood flow signal from the each set of third Doppler blood flow signals according to the preset screening frequency range corresponding to the each set of third Doppler blood flow signals.

In some embodiments, when the computer program is executed by the processor, the following operations may be implemented.

The operations may include: for each set of third Doppler blood flow signals, screening multiple sets of fourth Doppler blood flow signals within the preset screening frequency range from the each set third Doppler blood flow signals; and combining the multiple sets of fourth Doppler blood flow signals according to frequency sizes of the multiple sets of fourth Doppler blood flow signals, to obtain the target Doppler blood flow signal.

In some embodiments, when the computer program is executed by the processor, the following operations may be implemented.

The operations may include: determining a frequency range of the initial Doppler blood flow signals according to the pulse repetition frequencies of the initial Doppler blood flow signals; determining at least two preset screening frequencies from the frequency range of the initial Doppler blood flow signals; and generating the preset screening frequency set based on the at least two preset screening frequencies.

In some embodiments, a count of the preset screening frequency ranges may be the same as a count of the target screening frequencies. The preset screening frequency ranges may have no intersection. A union of the preset screening frequency ranges may be consistent with a frequency range of the initial Doppler blood flow signals.

In some embodiments, when the computer program is executed by the processor, the following operations may be implemented.

The operations may include: obtaining multiple sets of initial sampling data of Doppler blood flow signals in a first direction, wherein each set of initial sampling data may include initial sampling sub-data of multiple sampling points in a second direction, the first direction may be a sampling time direction of the initial sampling data, and the second direction may be a depth direction of a subject to be detected; for the initial sampling sub-data of each sampling point, performing a signal demodulation and a low-pass filtering processing on the initial sampling sub-data according to the second direction, to generate filtered sampling sub-data of each sampling point; for each set of initial sampling data, performing a summation processing on the filtered sampling sub-data of each sampling point in the initial sampling data according to the second direction, to generate new sampling data corresponding to the initial sampling data; combining the new sampling data to generate a new sampling data set; and combining multiple sets of new sampling data sets to generate multiple sets of initial Doppler blood flow signal sets.

The implementation principles and technical effects of the computer program product provided in some embodiments may be similar to those of the method embodiments, and may not be repeated here.

It should be noted that user information (including but not limited to user device information, user personal information, etc.) and data (including but not limited to data used for analysis, storage, display, etc.) involved in the present disclosure are all information and data authorized by the user or fully authorized by all parties.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for signal processing, wherein the method is implemented on a computer device having at least one processor and at least one memory, the at least one memory stores computer programs, the computer programs are executed by the at least one processor, and the at least one processor implements the following operations:

obtaining, with the at least one processor, multiple sets of initial Doppler blood flow signals, sampling times of the multiple sets of initial Doppler blood flow signals being discontinuous; and performing, with the at least one processor, a splicing processing on the multiple sets of initial Doppler blood flow signals, to obtain a target Doppler blood flow signal, the target Doppler blood flow signal being referred to as a continuous Doppler blood flow signal in a time domain;

wherein the splicing processing includes:
performing a first processing on the multiple sets of initial Doppler blood flow signals to obtain a first Doppler blood flow signal, the first Doppler blood flow signal including at least two sets of initial Doppler blood flow signals, wherein the first processing includes:
connecting an end point of a first set of initial signals of the multiple sets of initial Doppler blood flow signals and a starting point of a second set of initial signals of the multiple sets of initial Doppler blood flow signals in a slow time direction on a time axis, the slow time direction corresponding to a time interval between two adjacent signal receiving times or two adjacent signal transmitting times;

performing, with the at least one processor by multiple high-pass filters, a filtering processing on the first Doppler blood flow signal, respectively, to obtain multiple sets of second Doppler blood flow signals, cut-off frequencies of the multiple high-pass filters being different, and the multiple sets of second Doppler blood flow signals corresponding to different frequency ranges;

for each set of the multiple sets of second Doppler blood flow signals, performing, with the at least one processor, a time-frequency signal conversion on the multiple sets of second Doppler blood flow signals, respectively, to obtain multiple sets of third Doppler blood flow signals;

for the each set of the multiple sets of third Doppler blood flow signals, screening, with the at least one processor, multiple sets of fourth Doppler blood flow signals within a preset frequency range from the each set of the multiple sets of third Doppler blood flow signals; and combining the multiple sets of fourth Doppler blood flow signals according to frequency sizes of the multiple sets of fourth Doppler blood flow signals, to obtain the target Doppler blood flow signal.

2. The method of claim 1, wherein before the performing a first processing on the multiple sets of initial Doppler blood flow signals, the method further comprises:

ranking the multiple sets of initial Doppler blood flow signals according to an order of the sampling times of the multiple sets of initial Doppler blood flow signals.

3. The method of claim 1, wherein:

the time-frequency signal conversion includes a short-time Fourier transform, and a window length and a step size used in the short-time Fourier transform are determined based on the sampling times of the multiple sets of initial Doppler blood flow signals and a pulse repetition frequency of the each set of initial Doppler blood flow signals, wherein the window length refers to a count of sampling points in the slow time direction, the step size refers to a count of sampling points between two adjacent windows when a window slides in the slow time direction, the sampling times refer to time points at which the multiple sets of initial Doppler blood flow signals are sampled, and the pulse repetition frequency of the initial Doppler blood flow signals refers to a count of pulse sequences transmitted per unit time.

4. The method of claim 1, wherein the cut-off frequencies of the multiple high-pass filters are determined according to pulse repetition frequencies of the multiple sets of initial Doppler blood flow signals.

5. The method of claim 1, wherein:

multiple preset frequency ranges corresponding to the multiple sets of third Doppler blood flow signals have no intersection, and a union of the multiple preset frequency ranges corresponding to the multiple sets of third Doppler blood flow signals is determined based on pulse repetition frequencies of the multiple sets of initial Doppler blood flow signals.

6. The method of claim 1, wherein:

the preset frequency range corresponding to the each set of third Doppler blood flow signals is determined based on the cut-off frequencies of the multiple high-pass filters and pulse repetition frequencies of the multiple sets of initial Doppler blood flow signals.

7. The method of claim 1, wherein the obtaining multiple sets of initial Doppler blood flow signals comprises:

obtaining multiple sets of sampling data in the slow time direction, data from each single set of sampling data being obtained by continuous sampling, the each single set of sampling data being obtained by transmitting a single pulse sequence, data from different sets of sampling data being obtained by discontinuous sampling, the different sets of sampling data being different sets of sampling data obtained by transmitting a set of pulse sequences in different time periods, the each set of sampling data including first sampling sub-data of multiple sampling points in a fast time direction, and the fast time direction being a direction of a signal echo time in the three-dimensional coordinate system;

for the each set of sampling data, performing a second signal processing on the first sampling sub-data of the multiple sampling points according to the fast time direction, to obtain second sampling sub-data corresponding to the first sampling sub-data; and performing a third processing on the second sampling sub-data according to the fast time direction, to obtain a set of initial Doppler blood flow signals.

8. A method for signal processing, wherein the method is implemented on a computer device having at least one processor and at least one memory, the at least one memory stores computer programs, the computer programs are executed by the at least one processor, and the at least one processor implements the following operations:

obtaining, with the at least one processor, multiple sets of initial Doppler blood flow signals;

ranking, with the at least one processor, the multiple sets of initial Doppler blood flow signals according to a generation time of the multiple sets of initial Doppler blood flow signals, to generate a first Doppler blood flow signal such that a time of the first Doppler blood flow signal is continuous;

determining, with the at least one processor, a preset frequency set according to pulse repetition frequencies of the multiple sets of initial Doppler blood flow signals, the preset frequency set including at least two preset frequencies;

determining, with the at least one processor, multiple sets of second Doppler blood flow signals corresponding to the preset frequencies from the first Doppler blood flow signal based on the preset frequencies;

for each set of second Doppler blood flow signals, performing, with the at least one processor, a time-frequency signal conversion on the each set of second Doppler blood flow signals to generate multiple sets of third Doppler blood flow signals; and for each set of third Doppler blood flow signals, determining, with the at least one processor, a preset screening frequency range corresponding to the each set of third Doppler blood flow signals according to a target frequency of the each set of third Doppler blood flow signals and the pulse repetition frequencies of the multiple sets of initial Doppler blood flow signals;

for the each set of the multiple sets of third Doppler blood flow signals, screening, with the at least one processor, multiple sets of fourth Doppler blood flow signals within a preset frequency range from the each set of the multiple sets of third Doppler blood flow signals; and combining the multiple sets of fourth Doppler blood flow signals according to frequency sizes of the multiple sets of fourth Doppler blood flow signals, to obtain a target Doppler blood flow signal, the target Doppler blood flow signal being referred to as a continuous Doppler blood flow signal in a time domain; and generating a Doppler blood flow image based on the target Doppler blood flow signal.

9. The method of claim 8, wherein the determining multiple sets of second Doppler blood flow signals corresponding to the preset frequencies from the first Doppler blood flow signal based on the preset frequencies comprises:

determining multiple high-pass filters corresponding to the preset frequencies based on the preset frequencies, cut-off frequencies of the multiple high-pass filters being the preset frequencies; and performing, by the multiple high-pass filters, a filtering processing on the first Doppler blood flow signal, respectively, to generate the multiple sets of second Doppler blood flow signals corresponding to the preset frequencies.

10. The method of claim 8, wherein the determining a preset frequency set according to pulse repetition frequencies of the multiple sets of initial Doppler blood flow signals comprises:

determining a frequency range of the multiple sets of initial Doppler blood flow signals according to the pulse repetition frequencies of the multiple sets of initial Doppler blood flow signals;

determining the at least two preset frequencies from the frequency range of the multiple sets of initial Doppler blood flow signals; and generating the preset frequency set based on the at least two preset frequencies.

11. The method of claim 8, wherein:

a count of the preset frequency ranges is the same as a set count of the-multiple sets of third Doppler blood flow signals, the preset frequency ranges have no intersection, and a union of the preset frequency ranges is consistent with a frequency range of the multiple sets of initial Doppler blood flow signals.

12. The method of claim 8, wherein the obtaining multiple sets of initial Doppler blood flow signals comprises:

obtaining multiple sets of sampling data in the slow time direction, data from each single set of sampling data being obtained by continuous sampling, the each single set of sampling data being obtained by transmitting a single pulse sequence, data from different sets of sampling data being obtained by discontinuous sampling, the different sets of sampling data being different sets of sampling data obtained by transmitting different pulse sequences, the each set of sampling data including first sampling sub-data of multiple sampling points in a fast time direction, and the fast time direction being a direction of a signal echo time in the three-dimensional coordinate system;

for the each set of sampling data, performing a second signal processing on the first sampling sub-data of the multiple sampling points according to the fast time direction, to obtain second sampling sub-data corresponding to the first sampling sub-data; and performing a third processing on the second sampling sub-data according to the fast time direction, to obtain a set of initial Doppler blood flow signals.

13. The method of claim 8, further comprising:

performing a post-processing on the target Doppler blood flow signal and displaying the target Doppler blood flow signal, the post-processing including at least one of an image compression, an image smoothing, or an image enveloping.

14. A device for signal processing, comprising:

an obtaining module configured to obtain multiple sets of initial Doppler blood flow signals, sampling times of the multiple sets of initial Doppler blood flow signals being discontinuous; and a determination module configured to perform a splicing processing on the multiple sets of initial Doppler blood flow signals, to obtain a target Doppler blood flow signal, the target Doppler blood flow signal being referred to as a continuous Doppler blood flow signal in a time domain; wherein the splicing processing includes:

performing a first processing on the multiple sets of initial Doppler blood flow signals, to obtain a first Doppler blood flow signal, the first Doppler blood flow signal including at least two sets of initial Doppler blood flow signals, wherein the first processing includes:

connecting an end point of a first set of initial signals of the multiple sets of initial Doppler blood flow signals and a starting point of a second set of initial signals of the multiple sets of initial Doppler blood flow signals in a slow time direction on a time axis, the slow time direction corresponding to a time interval between two adjacent signal receiving times or two adjacent signal transmitting times;

performing, by multiple high-pass filters, a filtering processing on the first Doppler blood flow signal, respectively, to obtain multiple sets of second Doppler blood flow signals, cut-off frequencies of the multiple high-pass filters being different, and the multiple sets of second Doppler blood flow signals corresponding to different frequency ranges, for each set of the multiple sets of second Doppler blood flow signals performing a time-frequency signal conversion on the multiple sets of second Doppler blood flow signals, respectively, to obtain multiple sets of third Doppler blood flow signals;

for the each set of the multiple sets of third Doppler blood flow signals, screening, with the at least one processor, multiple sets of fourth Doppler blood flow signals within a preset frequency range from the each set of the multiple sets of third Doppler blood flow signals; and combining the multiple sets of fourth Doppler blood flow signals according to frequency sizes of the multiple sets of fourth Doppler blood flow signals, to obtain the target Doppler blood flow signal.

15. The device of claim 14, wherein:

the preset frequency range corresponding to the each set of third Doppler blood flow signals is determined based on the cut-off frequencies of the multiple high-pass filters and the pulse repetition frequencies of the multiple sets of initial Doppler blood flow signals.

16. The device of claim 14, wherein to obtain multiple sets of initial Doppler blood flow signals, the obtaining module is further configured to:
- obtain multiple sets of initial sampling data of Doppler blood flow signals in a first direction, wherein each set of initial sampling data includes initial sampling sub-data of multiple sampling points in a second direction, the first direction is a sampling time direction of the multiple sets of initial sampling data, and the second direction is a depth direction of a subject to be detected;
- for initial sampling sub-data of each sampling point, perform a signal demodulation and a low-pass filtering processing on the initial sampling sub-data according to the second direction, to generate filtered sampling sub-data of the each sampling point;
- for the each set of initial sampling data, perform a summation processing on the filtered sampling sub-data of the each sampling point in the each set of initial sampling data according to the second direction, to generate updated sampling data corresponding to the each set of initial sampling data;
- combine the updated sampling data corresponding to the multiple sets of initial sampling data to generate an updated sampling data set; and
- combine multiple sets of updated sampling data sets to generate the multiple sets of initial Doppler blood flow signals.

17. The device of claim 14, wherein before the performing a first processing on the multiple sets of initial Doppler blood flow signals, the splicing processing further comprises:
- ranking the multiple sets of initial Doppler blood flow signals according to an order of the sampling times of the multiple sets of initial Doppler blood flow signals.

18. The device of claim 14, wherein:
- the time-frequency signal conversion includes a short-time Fourier transform, and
- a window length and a step size used in the short-time Fourier transform are determined based on the sampling times of the multiple sets of initial Doppler blood flow signals and a pulse repetition frequency of the each set of initial Doppler blood flow signals, wherein the window length refers to a count of sampling points in the slow time direction, the step size refers to a count of sampling points between two adjacent windows when a window slides in the slow time direction, the sampling times refer to time points at which the multiple sets of initial Doppler blood flow signals are sampled, and the pulse repetition frequency of the initial Doppler blood flow signals refers to a count of pulse sequences transmitted per unit time.

19. The device of claim 14 wherein:
- multiple preset frequency ranges corresponding to the multiple sets of third Doppler blood flow signals have no intersection, and
- a union of the multiple preset frequency ranges corresponding to the multiple sets of third Doppler blood flow signals is determined based on pulse repetition frequencies of the multiple sets of initial Doppler blood flow signals.

* * * * *